United States Patent
Yang et al.

(10) Patent No.: US 12,063,267 B1
(45) Date of Patent: Aug. 13, 2024

(54) NETWORK TRAFFIC DISTRIBUTION FOR NETWORK-BASED SERVICES

(71) Applicant: Amazon Technologies, Inc., Seattle, WA (US)

(72) Inventors: Shijia Yang, Seattle, WA (US); Christoph Saalfeld, Seattle, WA (US); Eeshan Shreeram Thakar, Bellevue, WA (US); Artem Zhurid, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/067,585

(22) Filed: Dec. 16, 2022

(51) Int. Cl.
*H04L 67/1008* (2022.01)
*H04L 43/062* (2022.01)
*H04L 43/0817* (2022.01)

(52) U.S. Cl.
CPC ........ *H04L 67/1008* (2013.01); *H04L 43/062* (2013.01); *H04L 43/0817* (2013.01)

(58) Field of Classification Search
None
See application file for complete search history.

(56) References Cited

U.S. PATENT DOCUMENTS

| | | | |
|---|---|---|---|
| 2005/0021751 A1* | 1/2005 | Block | H04L 67/1017 714/E11.073 |
| 2012/0321052 A1* | 12/2012 | Morrill | H04L 12/5692 379/32.01 |
| 2015/0012663 A1* | 1/2015 | Mandar | H04L 47/125 709/233 |
| 2016/0248703 A1* | 8/2016 | Gopalakrishnan | H04L 45/586 |

* cited by examiner

*Primary Examiner* — Anh Nguyen
(74) *Attorney, Agent, or Firm* — Knobbe Martens Olson & Bear LLP

(57) ABSTRACT

The present disclosure generally relates to leveraging DNS (Domain Name Service) based client-side load balancing that directs IoT devices (clients) to network load balancer IP addresses. A management system obtains socket usage information about publicly accessible network load balancers. The system then uses socket thresholding information to determine whether individual network load balancers are exhausting a fixed set of available sockets. The system can then implement remedial actions to reduce individual network load balance presence to ensure that the IoT devices are equally distributed across all first layer network load balancers to maximize usage of capacity.

29 Claims, 9 Drawing Sheets

NETWORK TRAFFIC DISTRIBUTION FOR NETWORK-BASED SERVICES

BACKGROUND

Generally described, computing devices can utilize communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, hosted computing environments or data processing centers, generally referred to herein as "data centers," may include a number of interconnected computing systems to provide computing resources to users of the data center. The data centers may be private data centers operated on behalf of an organization or public data centers operated on behalf of, or for the benefit of, the general public In general, network-based computing is an approach to providing access to information technology resources through services, such as Web services. In some implementation, hardware or software support network-based services and may be configured to be dynamically scalable to meet demand for network-based services. In network-based computing, elasticity refers to network-delivered computing resources that a network service provider can scale up and down to adapt to changing requirements of users. For example, the elasticity of these resources can be in terms of processing power, storage, bandwidth, and so forth. Elastic computing resources may be delivered automatically and on-demand, dynamically adapting to the changes in resource requirements on or within a given user's system. For example, a client can use a network service to host a large online data communication service, set up with elastic resources so that the number of webservers storing the data for the users efficiently accesses the data, such that scale up when the system usage is higher, and then scale back down when system usage is lighter.

To utilize network-based services, client computing devices can establish temporary, semi-permanent, or permanent communication channels with one or more network-based service. The established communication channels facilitate the exchange of communications, such as requests for computing processing, receipt of collected data, request for data, and the like. To facilitate increased utilization of network resources with higher network traffic (e.g., a measure of the exchanged communications), a network-service can utilize load balancing technology (e.g., one or more network load balances) that allows efficient network resource usage by managing incoming network traffic that is allocated to one or more network resources. Generally described, network load balancers can be implemented in manner to receive incoming communications, such as the edge of the network, and configured to distribute the network traffic across all network resources (e.g., network-based server devices). In a common example, network load balancers can uniformly distribute incoming network traffic across all network resources associated with individual network load balancers. Such load balancer implementations allow a capacity of the network-based server to be defined in terms of the network traffic that is equally allocated to a group of network-based resources. Accordingly, the capacity of the network traffic processing can also be increased by scaling up (e.g., adding more servers) or scaling down (e.g., removing one or more servers) based on network traffic utilization.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1A:
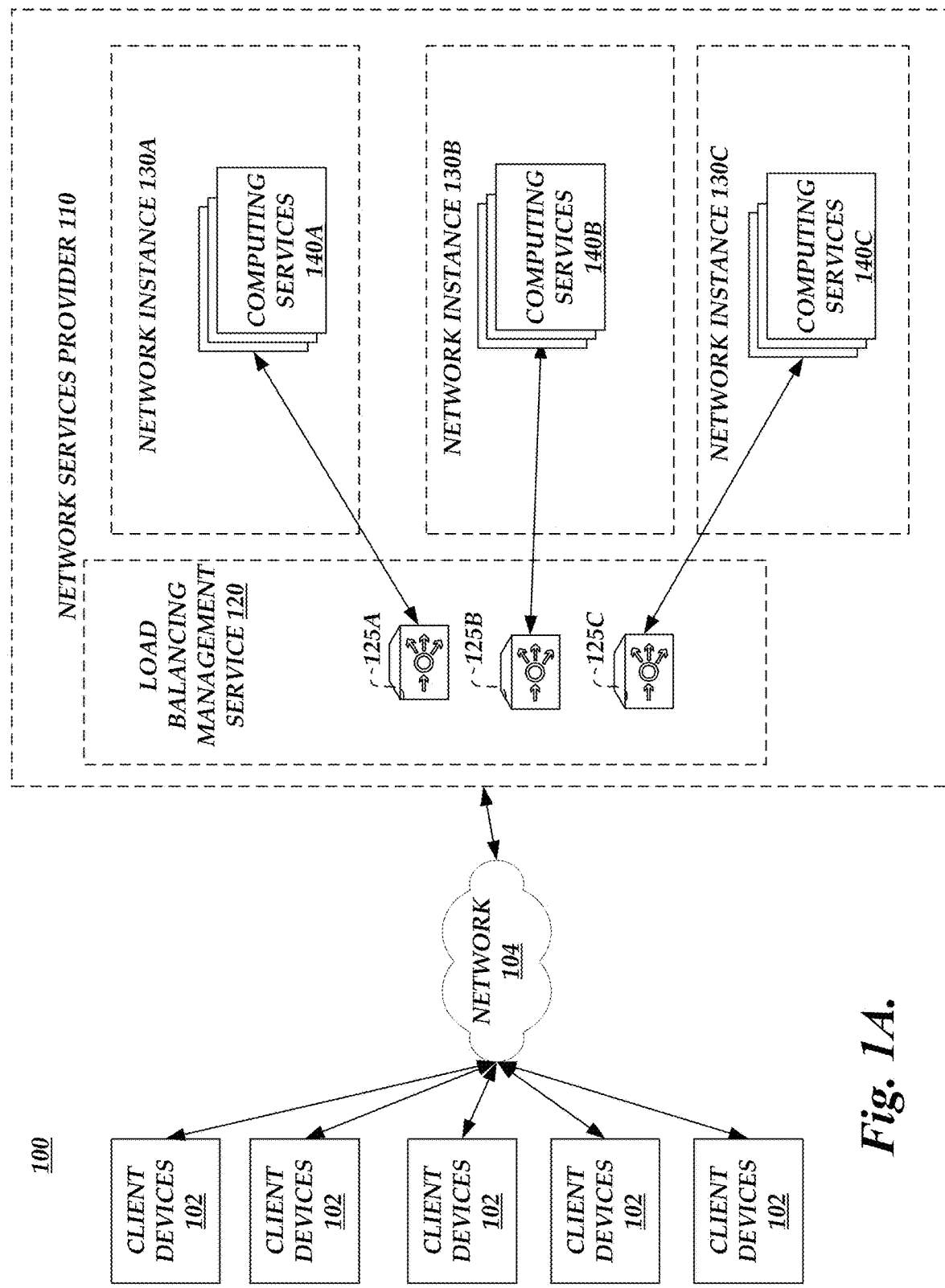
FIG. 1A depicts a schematic diagram of a network service provider in which various embodiments, according to the present disclosure, can be implemented.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Generally described, aspects of the present disclosure relate to the management of network load balancers to provide a seamless network connection and efficient network traffic distribution across a network. The network, for example, can be generally described as a computer network (e.g., data network) and includes a series of interconnected nodes (e.g., servers) that can transmit, receive, and exchange data to facilitate endpoint users to share resources and communicate with network services (e.g., network services provided by network service provider). Illustratively, one or more aspects of the present application correspond to the utilization of a network load balancing management service to configure network configuration based on network traffic and its utilization of the network resources. The network load balancing management service may require configuring the network traffic distribution to maximize the usage of the network resources.

The network load balancer, as disclosed herein, can be a domain name service (DNS) based network load balancer implemented at the front end of the network (e.g., client-side). The domain name can be associated with one or more IP addresses. Once a client requests to access to a specific domain, the network service provider may provide the list of IP addresses associated with the specific domain. Each of the IP addresses can be connected with servers, such as DNS servers. Thus, the network load balancer can distribute the network traffic across the DNS servers. For example, if a plurality of clients request access to an internet domain, a list of IP addresses associated with the domain's name will be generated by receiving a response, such as an advertisement of the IP addresses associated with the domain. Then, the network load balancer may distribute the network traffic caused by the clients to access the web domain across the DNS servers. In some embodiments, the network service provider can provide a network-based environment, which may also be referred to as a computing cloud environment. In these embodiments, the network service provider may provide a list of network instances associated with the domain name. These network instances can be accessible by private IP addresses. In the backend of the network, these IP addresses are translated into public IP addresses and distributed to network instances. For example, once a plurality of clients request access to a specific domain, the list of IP addresses, such as public IP addresses, may respond to the clients' request. In this example, the list of IP addresses can correspond to private IP addresses associated with the IP addresses of network instances. The network load balancer in this example may distribute the network traffic to the list of network instances. Then each network instance may include a physical layer that that can have endpoints correspond to a two-way communication link between two devices (e.g., a socket). Individual sockets may be bound to a port number so that the TCP layer can identify the application that data is destined to be sent to. An endpoint is a combination of an IP address and a port number for communications according to a specific transport protocol, such as the transmission control protocol (TCP). In some embodiments, a single load balancer can include multiple virtual load balancers. In these embodiments, each virtual load balancer can be associated with one or more targets. The targets can be internet protocol (IP) addresses, target ports, or a combination of the IP addresses and ports. Thus, the clients' requests or data can be transmitted to the endpoints.

In accordance with one or more aspects of the present application, the network load balancing management service can include one or more network load balancers. Each network load balancer can correspond to a plurality of client devices and its instructions or requests that transmit data to network service providers. For example, a plurality of client devices may request access to a website by utilizing a search engine. In this example, the network load balancer, such as a front-end network load balancer, can be located between the plurality of client devices and network resources associated with the website, such as servers associated with the website. Then, the network load balancer can distribute the network data generated from the plurality of client devices. By way of example, if a network-based service is configured with a fixed number of network resources, such as 10 network-based servers, the network traffic generated from the plurality of client devices can be equally distributed to the fixed number of network resources, e.g., an equal distribution among the 10 servers. In some embodiments, the load balancers can be arranged in a hierarchical configuration. For example, the load balancers are arranged in multiple layers, and the network traffic generated in a load balancer located in the higher layer can be distributed to the lower layer load balancers, such that a load balancer located in layer 1 can distribute its network traffic to the load balancers located in layer 2.

In accordance with one or more aspects of the present application, the network load balancing management service can identify the current capacity of each of the network load balancers. In some embodiments, the network load balancing management service identifies the current capacity of each network load balancer by checking the number of available sockets associated with the network load balancer. For example, if a network load balancer utilizes TCP sockets to distribute the data or network traffic, the network load balancing management service may identify the number of available sockets for each network load balancer. After identifying the current capacity of the network load balancers, the network load balancing management service may determine one or more actions to facilitate the seamless and efficient network connection across the network. Illustratively, the network load balancing management service, in response to determining that one of the network load balancers has a capacity less than a threshold value, may reconfigure the network traffic distribution by rerouting the network traffic to the network load balancer to the other network load balancers.

In accordance with one or more aspects of the present application, one or more client devices can correspond to computing devices that are configured as a collective network of connected devices and the technology that facilitates communication between devices and the network. Such client devices may be generally referred to Internet of Things (IOT devices are implemented as the client devices. Generally described, IoT devices are network-connected devices with a primary function other than general purpose computation. The IoT devices can be configured to generate data, such as messages, for transmission to network services with a messaging protocol, such as the MQ Telemetry Transport ("MQTT") messaging protocol. In the deployment of the IoT devices, a plurality of IoT devices can be deployed to communicate with a network service provider that each of the plurality of IoT devices is generating data and transmitting it to the network service provider. For example, a voice controller in a household can be the IoT device, and if a million households use the voice controller, the voice controller data can be generated from the millions of households and exchanged and processed within a network. The network communication protocol, according to one or more aspects of the present disclosure, may include one or more wireless networks, such as a Global System for Mobile Communications (GSM) network, a Code Division Multiple Access (CDMA) network, a Long Term Evolution (LTE) network, or any other type of wireless network. For example, the network communication protocols used herein may include Hypertext Transfer Protocol (HTTP), HTTP Secure (HTTPS), Constrained Application Protocol (CoAP), and the like. Protocols and components for communicating via the Internet or any of the other aforementioned types of communication networks are well known to those skilled in the art and, thus, are not described in more detail herein.

Generally, a traditional network load balancer for distributing data across the network resources presents significant technical challenges for clients and network-based services providers. More specifically, the network load balancer may distribute a high volume (e.g., meta data) of network traffic across the network resources associated with the network load balancer. In some aspects, the network load balancer, such as the internet protocol type of network load balancer, can include IP addresses that each of the IP addresses is associated with a network device, such as the network device using transmission control protocol (TCP). In these aspects, the network traffic cannot be uniformly distributed across the TCP sockets in the network devices associated with the IP address. For example, if the TCP socket with 16-bit is utilized, the maximum number of sockets for each of the IP address (e.g., IP address associated with a TCP socket) is 65,535, a network load balancer may establish a network connection between a plurality of client devices (e.g., plurality of IoT devices) and the network devices associated with the IP addresses, and each TCP socket can be connected with a client device. However, the available ports for each of the TCP sockets can be different due to network resource utilization, TCP socket programming, size of data, etc. For example, if there are three IP addresses and three network devices that, each network device is associated with each IP address, the number of available TCP sockets for each of the network devices can be different, such that a different number of TCP sockets for each network devices are already established connections with existing client devices or that each network devices are programmed differently in reserving the available TCP sockets.

In one aspect, the network load balancer can have a challenge in providing seamless and efficient network connections between the client devices (e.g., IoT devices) and the network service provider. For example, a network load balancer can distribute network traffic to three IP addresses, and each IP address corresponds to a network device, so a client device (e.g., IoT device) can establish a network connection with each socket in the network device. However, the network load balancer, even though one or more network devices associated with the network load balancer does not have available sockets, the network load balancer may continuously try to establish a network connection with the network device that does not have the available sockets. For example, if each network device has a different number of available sockets, such that the first, second, and third network devices can have 53,667, 57,669, and 62,556 available sockets, respectively, the network load balancer may continuously distribute the network traffic to the network devices even though the first network devices already consumed all of the sockets. Thus, the network load balancer may perform a remedial action, such as terminating all of the network connections established via the network load balancer, and a network administrator may need to reconnect the terminated network connections.

To address at least a portion of the above-described deficiencies, one or more aspects of the present disclosure correspond to systems and methods for monitoring the network load balancers and optimizing the network traffic by analyzing the monitoring results of the network load balancers. According to one or more embodiments as disclosed herein, a network load balancing management service may monitor the remaining capacity of each network load balancer. Based on the monitoring results, such as the remaining capacity of each network load balancer, the network load balancing management service may perform one or more remedial actions to provide a seamless connection between the plurality of client devices and network services.

Illustratively, the network load balancing management service may analyze or characterize current status of a set of network load balancers. In this illustration, the network service provider may include multiple network load balancers, and each network load balancer can include multiple IP addresses that can be utilized to distribute the network traffic of the network load balancer. In some embodiments, the network load balancing management service accesses the network instances associated with the IP addresses. In these embodiments, the network load balancing management service may determine the current utilization state of the sockets in the network instances. For example, if one of the network instances has a socket utilization that reached its threshold values, the network load balancing management service may identify the network load balancer that includes the network instances as a highly utilized network load balancer. In some embodiments, the network load balancing management service can perform the monitoring of the current state of the network instances by monitoring the network resource's performance metrics, such as the network bandwidth, computational performance, cache, latency, network service capacity, reliability, security, quality of network service, packet-per-second (PPS) performance, etc.

In some embodiments, the network load balancing management service can provide remedial actions based on the monitoring results of the network load balancer. In these embodiments, the network load balancing management service may perform one or more remedial actions in determining that one or more network load balancers has a remaining capacity less than threshold values. The remedial actions, for example, can include redistributing the network traffic to other network load balancers, having a lower utilization of its capacity. The remedial actions can also include performing a health check for the network load balancer. For example, the network load balancing management service may include a connectivity check to the network instances associated with the IP addresses corresponding to the network load balancer, a local processing check, such as processing crash and/or ability to write or read, a configuration check, abnormality detection, such as a clock skew or failure mode, etc. The remedial action can also include not advertising the IP addresses included in the network load balancer, having a lower available capacity and/or unhealth state. For example, in response to receiving a request related to a specific domain name, the certain IP addresses associated with the network load balancer, having a lower available capacity and/or unhealth state, may not advertise their availability, thus, these IP addresses do not receive data related to the specific domain name.

In some embodiments, the network load balancing management service can optimize the network traffic distribution based on the size of data transmitted from client devices (e.g., IoT devices) and the current state of each network load balancer. For example, on client side, the network load balancing management service may anticipate the size of the data that can be transmitted from client devices. On the network load balancer side, the network load balancing management service may determine the current state of the network instances associated with each network load balancer. Based on analysis of the anticipated size of the data generated from the client devices and the current state of each network load balancer, the network load balancing management service may distribute the data to the network load balancers.

In some embodiments, the network load balancing management service may prioritize the data transmitted from the client devices and distribute the data based on the prioritization and the current state of each network load balancer. In these embodiments, the network load balancing management service may determine the weight of each data generated from the plurality of client devices. The weight can be determined based on the prioritization of the data and/or the size of the data. Thus, the network load balancing management service may distribute the data based on the weight of each data. For example, the data with higher weight can be distributed to a network load balancer that has a lower capacity utilization and/or a healthier state.

Although aspects of the present disclosure will be described with regard to illustrative network components, interactions, and routines, one skilled in the relevant art will appreciate that one or more aspects of the present disclosure may be implemented in accordance with various environments, system architectures, customer computing device architectures, and the like. Similarly, references to specific devices, such as a customer computing device, can be considered to be general references and not intended to provide additional meaning or configurations for individual customer computing devices. Additionally, the examples are intended to be illustrative in nature and should not be construed as limiting.

FIG. 1A depicts a block diagram of an embodiment of the system 100. The system 100 can include a network 104, the network connecting a number of client devices 102, and network service provider 110. Illustratively, the various aspects associated with the network service provider 110 can be implemented as one or more components that are associated with one or more functions or services. The components may correspond to software modules implemented or executed by one or more customer computing devices, which may be separate stand-alone customer computing devices. Accordingly, the components of the network service provider 110 should be considered as a logical representation of the service, not requiring any specific implementation on one or more customer computing devices.

Network 104, as depicted in FIG. 1A connects the devices and modules of the system. The network 104 can connect any number of client devices. In some embodiments, a network service provider provides network-based services to client devices via the network 104. A network service provider 110 can implement a network load balancing management service 120 and network instances 130A, 130B, and 130C. The network instances 130A, 130B, and 130C can refer to a large, shared pool of network-accessible computing resources (such as compute, storage, or networking resources, applications, or services), which may be virtualized or bare-metal. The network service provider 110 can provide on-demand network access to a shared pool of configurable computing resources that can be programmatically provisioned and released in response to network configuration. These resources can be dynamically provisioned and reconfigured to adjust to the variable load. The concept of "cloud computing" or "network-based computing" can thus be considered as both the applications delivered as services over the network and the hardware and software in the network service provider. In some embodiments, the network 105 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein. In some embodiments, the network 104 may include some or all of the same communication protocols, services, hardware, etc. Thus, although the discussion herein may describe communication between the client devices 102 and the network service provider 110 via the network 104 is not limited in this manner. The various communication protocols discussed herein are merely examples, and the present application is not limited thereto.

The client device 102 in FIG. 1A can connect to the network and the network service provider 110. The client device 102 may be representative of internet on things (IOT) devices. The client device 102 can also be a computing network associated with a plurality of customer computing devices. For illustration purposes, client device 102 represents a data generation and transmission and/or the client's action to access network services, such as web service, clouding service, etc.

The client device 102 can be configured to transmit a request to the network service provider 110 to, illustratively access one or more network services via the network 104. Illustratively, a plurality of client devices 102 can request to access to a network service, such as accessing to a webpage, and these requests can be distributed across the network instance 130. The client devices 102 can be IoT devices, mobile devices, personal computers, servers, or other types of devices.

The client device 102, as disclosed herein, can also generally refer to IoT devices. Generally described, IoT devices are network-connected devices with a primary function other than general purpose computation. The IoT devices can be configured to generate data, such as messages, for transmission to network services with a messaging protocol, such as the MQ Telemetry Transport ("MQTT") messaging protocol. In the deployment of the IoT devices, a plurality of IoT devices can be deployed to communicate with a network service provider that each of the plurality of IoT devices is generating data and transmitting it to the network service provider. For example, a voice controller in a household can be the IoT device, and if a million households use the voice controller, the voice controller data can be generated from the millions of the households and exchanged and processed within a network. The number of client devices 102, as disclosed herein, is not limited to any specific number.

Illustratively, the network service provider 110 can include load balancing management service 120 and network instance 130. The load balancing management service 120 can include one or more network load balancers 125A, 125B, and 125C. The network load balancers 125A, 125B, and 125C can provide functionality responsive to receiving data from the client devices 102, such as network traffic distribution for providing seamless connections to the client devices 102 and efficiently utilizing the network resources by optimizing network traffic distribution. As illustrated in FIG. 1A, the load balancing management service 120 can include a set of network load balancers 125A, 125B, 125C, etc. Illustratively, each network load balancer 125 can be configured to direct the network traffic to the associated network instance 130. For example, the network load balancers 125A, 125B, and 125C may distribute their network traffic across the network instances 130A, 130B, and 130C, respectively. In some embodiments, each network instance 130A, 130B, and 130C can include multiple computing services. In these embodiments, these network instance 130A, 130B, and 130C are provided in a virtual computing environment. For example, each network instance 130A, 130B, and 130C can be accessed via designated IP addresses, and the load balancers 125A, 125B, and 125C can direct the network traffic to the network instance 130A, 130B, and 130C, respectively, by utilizing the designated IP addresses. For example, the network load balancer 125A can distribute its network traffic to the network instance 130A by accessing to the IP addresses associated with each network instance 130A, 130B, and 130C. The network load balancer 125 can implement various distribution techniques, such as round robin load balancing, weighted round robin load balancing, least connection load balancing, weighted least connection load balancing, resource based load balancing, adaptive load balancing, fixed weighting load balancing, weighted response time load balancing, source IP hash load balancing, URL hash load balancing, etc. In some embodiments, each network load balancer 125 can be configured to utilize one or more network communication protocol to direct the network traffic to the associated network instance 130. For example, if some of the client devices utilize HTTPS, and other client devices utilizes MQTT, the network load balancer 125 may distribute the network traffics generated from the client devices by utilizing the network protocols utilized in each of the client devices.

In some embodiments, the network load balancer 125 can be a domain name service (DNS) based network load balancer located in the front end of the network (e.g., client side). The domain name can be associated with one or more IP addresses. Once a client requests access to a specific domain, the network service provider may provide the list of IP addresses associated with the specific domain. In some embodiments, the network service provider 110 can provide a computing cloud environment. In these embodiments, the network service provider 110 may provide a list of network instances associated with the domain name. These network instances can be accessible by private IP addresses. In the backend of the network, these IP addresses are translated into public IP addresses and distributed to network instances 130, such as servers. For example, once a plurality of clients request access to a specific domain, the list of IP addresses, such as public IP addresses, may respond to the clients' request. In this example, the list of IP addresses can correspond to private IP addresses associated with the IP addresses of network instances. The network load balancer 125 in this example may distribute the network traffic to the list of network instances. Then each network instance may include multiple sockets (e.g., data socket), such as transmission control protocol (TCP) sockets. Thus, the clients' requests or data can be transmitted to the end points.

In some embodiments, the network instances 130A, 130B, and 130C can be virtual machine hosted in a cloud computing environment. In these embodiments, the network instances 130A, 130B, and 130C can be accessed via internet protocol (IP) addresses. In some embodiments, accessing via the IP addresses can be based on TCP protocol. In these embodiments, each IP address can correspond to sockets (e.g., port) implemented in the network layer of the network instances 130A, 130B, and 130C.

The network service provider 110 further includes a network load balancing management service 120. The network load balancing management service 120 can be configured to manage the operation of the network load balancers 125A, 125B, and 125C. For example, the network load balancing management service 120 may monitor the current state of the network load balancers 125A, 125B, and 125C and perform remedial actions based on the monitoring results. In some embodiments, the network load balancing management service 120 can be configured to monitor the available sockets for each load balancer. In these embodiments, if one or more of the load balancers 125A, 125B, and 125C have the available sockets below a threshold, the network load balancing management service 120 may apply a remedial actions. For example, if the network load balancer 125A has a number of available sockets below the threshold number, the network load balancing management service 120 may reroute the incoming data to the network load balancer 125A to other network load balancers 125B and/or 125C. In this example, the network load balancing management service 120 may also perform a health check for the network balancer 125A. The health check may include a connectivity check to the network instances associated with the IP addresses corresponding to the network load balancer, a local processing check, such as processing crash and/or ability to write or read, a configuration check, abnormality detection, such as a clock skew or failure mode, etc.

Figure 1B:
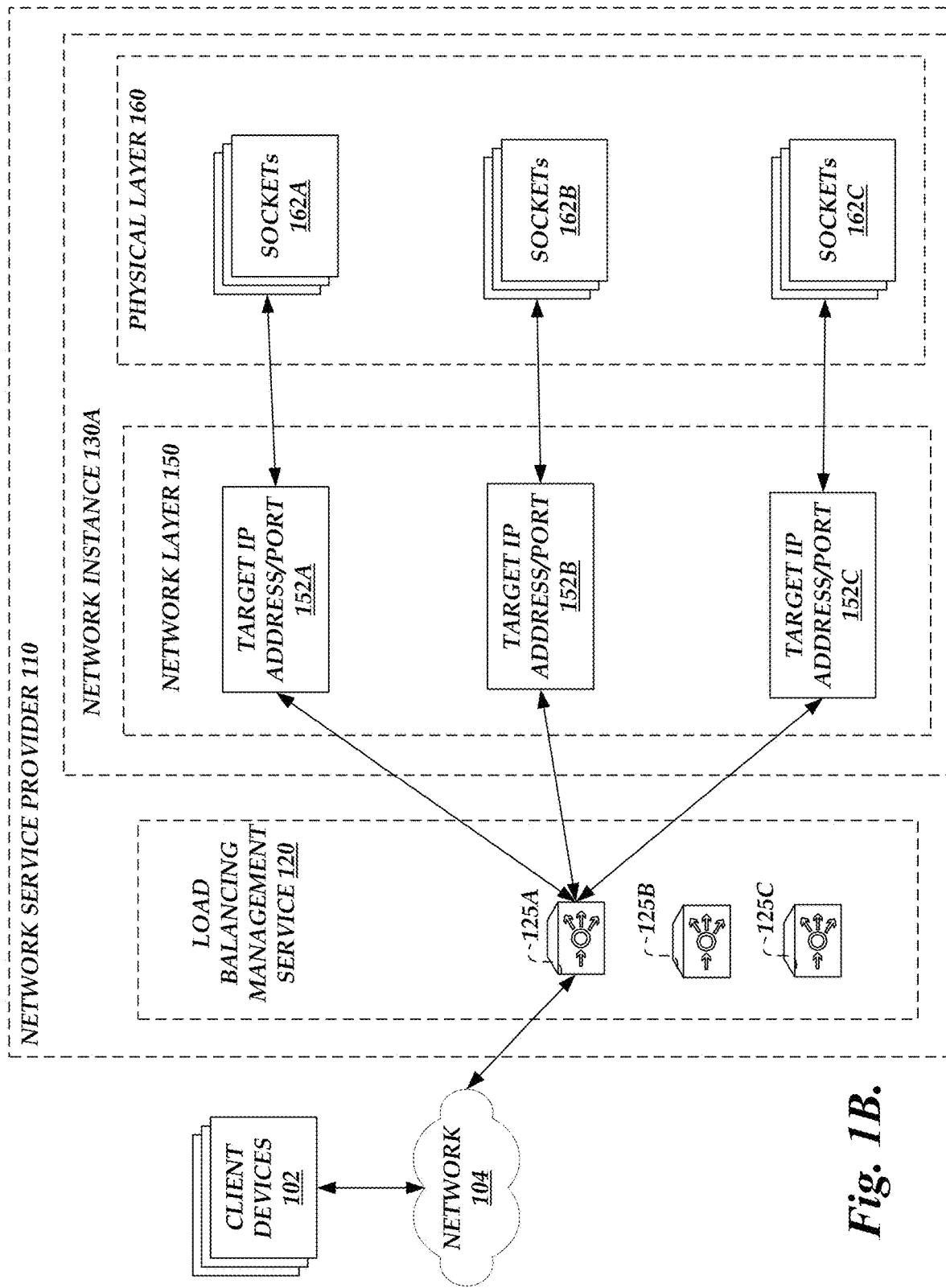
FIG. 1B depicts a subset of the schematic diagram of a network service provider of FIG. 1A, illustrating the configuration and management of a network load balancer in which various embodiments according to the present disclosure can be implemented.

FIG. 1B depicts a block diagram of a network traffic distribution according to one or more embodiments as disclosed herein. In some embodiments, the network load balancers 125 uses a domain name system (DNS) type load balancing. In these embodiments, the network load balancer 125 can distribute the data generated from the client devices 102 by configuring IP addresses associated with a specific domain. For example, if the client devices 102 request a DNS query to a specific domain, such as aaa.com, a list of IP addresses corresponding to the "aaa.com" domain can be identified. In some embodiments, the network service provider 110 can provide a list of targets associated with the identified IP addresses, which are combined together (with the corresponding protocol type) to form a socket address. In these embodiments, each target can be target IP address or target port. In some embodiments, the target IP addresses or ports may correspond to virtual machine instances. For example, network instances 130A, shown in FIG. 1B, can represent virtual machine instance. Thus, in these embodiments, the network load balancer 125A can distribute the network traffic generated from the client devices across the network instance 130A (represented as network instances 130A, 130B, and 130C in FIG. 1A). The target IP addresses/ports 152A, 152B, and 152C, as disclosed herein, can represent the target as target IP address or port. Thus, the network layer 150 can include a combination of target IP addresses and target ports. For example, the network instances 130A, 130B, and 130C (shown in FIG. 1B) can correspond to specific target IP addresses, TCP target ports, or a combination of the target IP addresses and TCP target ports. In some embodiments, each network load balancer, 125A, 125B, or 125C can include multiple virtual load balancers. For example, the network load balancer 125A can include multiple virtual load balancers. In these embodiments, the virtual load balancers can be connected (wired or wirelessly) to the corresponding target IP address or target ports.

In some embodiments, the network instance 130A (e.g., virtual instance) can include network layer 150 and physical layer 160. In these embodiments, the network layer 150 may include at least one target. The target can be a target IP address or target port (hereinafter "target IP address/port") 152A, 152B, and 152C. Thus, in some embodiments, the network layer 150 can include target IP addresses, target ports, or a combination of target IP addresses and target ports. These target IP addresses/ports can be designated by the network service administrator and/or the network service user. In some embodiments, these target IP address/port 152A, 152B, and 152C can be associated with public IP addresses, each individually forming a socket address. For example, when a client request to access to a domain, the network service provider 110 may provide a list of public domain associated with the domain. Then, the load balancer 125A may convert the list of public IP addresses into the target IP addresses/ports 152A, 152B, and 152C. In some embodiments, the target IP address/port are associated with TCP sockets.

In some embodiments, the load balancer 125A, 125B, and 125C may advertise the target IP addresses/ports 152A, 152B, and 152C that can receive the network traffic generated from the client devices 102. For example, in response to receiving the client's request by the client calling a domain name, the load balancer 125A may identify the public IP addresses associated with the domain and advertise the target IP addresses/ports 152A, 152B, and 152C.

In some embodiments, the network instance 130A can direct the network traffic based on a specific network protocol. For example, the network instance 130A can direct the network traffic by utilizing transport layer protocol (TCP) sockets implemented in the physical layer 160 of the network instance 130A. As shown in FIG. 1B, the network instance 130A direct the network traffic to the sockets 162A implemented in the physical layer 160. The maximum number of socket with 16 bits utilization can be 65,535. Thus, the network traffic directed to the physical layer 160 can be distributed to these sockets 162. In some embodiments, each network load balancer 125A can be configured to utilize one or more network communication protocol to direct the network traffic to the target IP address/port. For example, if some of the client devices utilize HTTPS, and other client devices utilizes MQTT, the network load balancer 125A may distribute the traffic generated from the client devices that utilizes the HTTPS to the target address/port 152A and distribute the traffic generated from the client devices that utilizes the MQTT to the target address/port 152B.

In some embodiments, the network load balancer 125 can include multi layers to distribute the network traffic. For example, a first layer of the network load balancer 125A, 125B, and 125C can be configured to distribute the data generated from the client devices into the target IP addresses/ports 152A, 152B, and 152C. This first layer can also be configured to convert the public IP addresses into the IP addresses or TCP ports associated with the target IP addresses/ports 152A, 152B, and 152C. For example, if the client device 102 requests a DNS query, the IP addresses (e.g., public IP addresses) can be converted into the IP addresses or TCP ports associated with the target IP addresses/ports 152A, 152B, and 152C, thus, the network load balancer 125 can distribute the network traffic into the the target IP addresses/ports 152A, 152B. The network load balancer 125A, 125B, and 125C can also include a second layer. This second layer can be utilized to direct the network traffic generated from the the target IP addresses/ports 152A, 152B, and 152C into the sockets 162A, 162B, and 162C. In some embodiments, the network load balancer 125 can be configured to include the TCP sockets 162A, 162B, and 162C in its network level 4.

In some embodiments, the network load balancing management service 120 may analyze the current state of the network load balancers 125A, 125B, and 125C. In some embodiments, the network load balancing management service 120 monitors the network load balancers 125A, 125B, and 125C and network instances 130A to determine the current utilization state of the network load balancers, such as the current utilization of the sockets associated with each load balancer. For example, if one of the sockets 162, 162B, and 162C in the physical layer 160 has its utilization that reached its threshold values, the network load balancing management service 120 may identify the network load balancer. For example, if the sockets 162A associated with the network load balancer 125A reached its utilization above a threshold, the network load balancing management service 120 may identify the network load balancer 125A as a highly utilized network load balancer.

In some embodiments, the network load balancing management service 120 can provide remedial actions based on the monitoring results of the network load balancers 125A, 125B, and 125C. In these embodiments, in determining that one or more network load balancers has a remaining capacity of less than threshold values, the network load balancing management service 120 may perform one or more remedial actions. For example, if the network load balancing management service 120 identifies the network load balancer 125A has a highly utilized capacity ratio, the network load balancing management service 120 may perform remedial actions, such as redistributing the incoming network traffic to other network load balancers 125B and 125C.

The remedial actions, for example, can include redistributing the network traffic to other network load balancers, having a lower utilization of its capacity. The remedial actions can also include performing a health check for the network load balancer. For example, the network load balancing management service 120 may include a connectivity check to the network instances associated with the IP addresses corresponding to the network load balancer, a local processing check, such as processing crash and/or ability to write or read, a configuration check, abnormality detection, such as a clock skew or failure mode, etc. The remedial action can also include not advertising the IP addresses included in the network load balancer, having a lower available capacity and/or unhealth state. For example, in response to receiving a request related to a specific domain name, the certain IP addresses associated with the network load balancer, having a lower available capacity and/or unhealth state may not advertise its availability, thus, these IP addresses do not receive data related to the specific domain name.

In some embodiments, the network load balancing management service 120 can optimize the network traffic distribution based on the size of data transmitted from client devices (e.g., IoT devices) and the current state of the network load balancers 125A, 125B, and 125C. For example, the network load balancing management service 120 may anticipate the size of the incoming data transmitted from client devices 102. The network load balancing management service 120 may further determine the current state of the network load balancers 125A, 125B, and 125C. Based on analysis of the anticipated size of the data generated from the client devices and the current state of each network load balancer, the network load balancing management service may distribute the data to the network load balancers. For example, if the anticipated incoming data to the network load balancer 125A is 500 MB and the remaining capacity of the network instance 130 associated with the network load balancer 125A is about 500 MB, the network load balancing management service 120 may reroute the data into other network load balancers 125B and 125C.

In some embodiments, the network load balancing management service 120 may prioritize the data transmitted from the client devices 102 and distribute the data based on the prioritization and the current state of network load balancers 125A, 125B, and 125C. In these embodiments, the network load balancing management service 120 may determine the weight of each data generated from the plurality of client devices 102. The weight can be determined based on the prioritization of the data and/or the size of the data. Thus, the network load balancing management service 120 may distribute the data based on the weight of each data. For example, if the current state of each network load balancer 125A, 125B, and 125C is 60%, 75%, and 80%, respectively, the data with higher weight can be distributed to the network load balancer 125A.

Figure 1C:
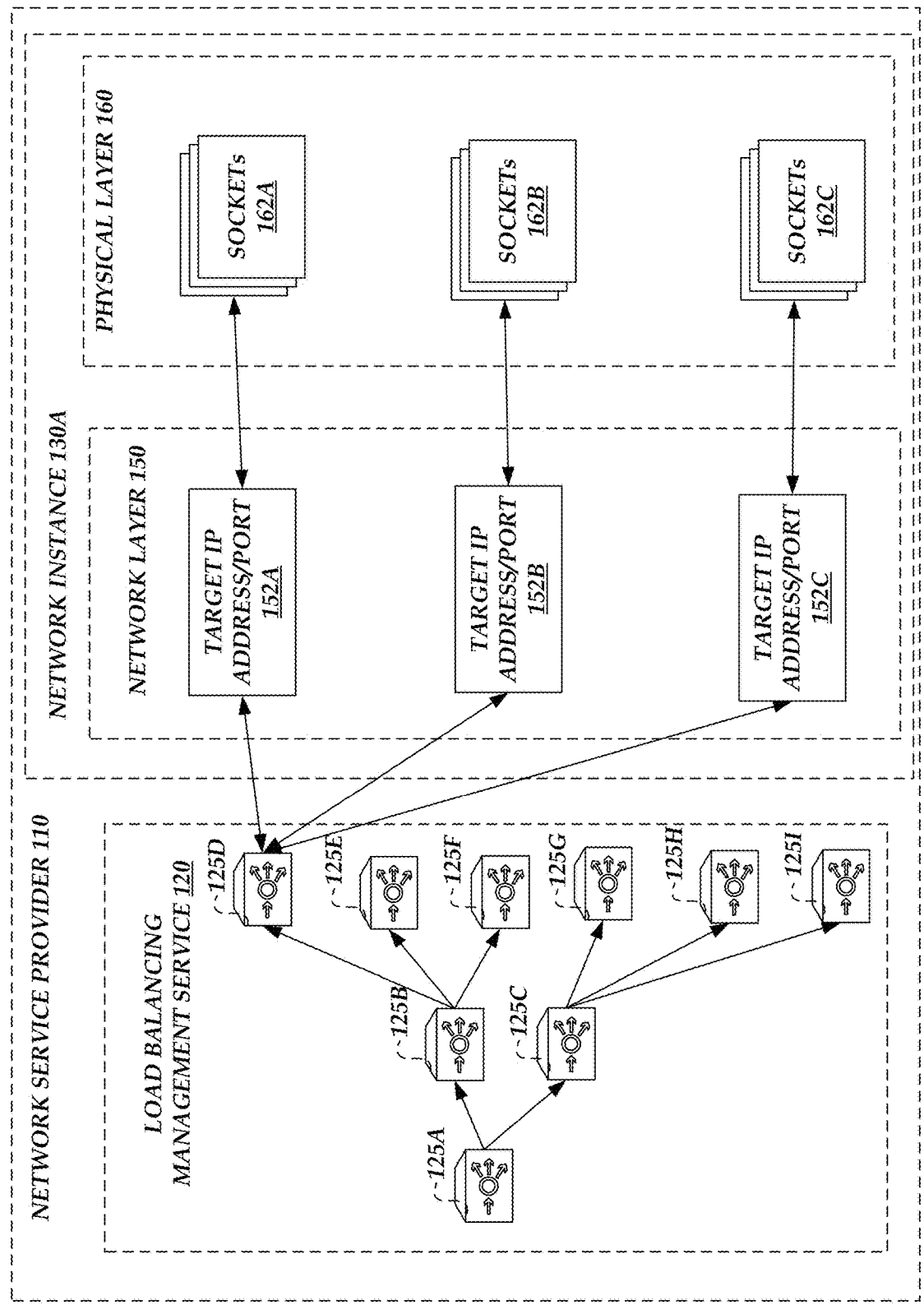
FIG. 1C depicts a schematic diagram of a network service provider that includes load balancers arranged in a hierarchical configuration, according to the present disclosure, can be implemented

FIG. 1C depicts a block diagram of a network traffic distribution according to one or more embodiments as disclosed herein. In some embodiments, the network service provider 110 configures or arranges load balancers in a hierarchical configuration. For example, as shown in FIG. 1C, the first layer includes the load balancer 125A. The incoming network traffic into the load balancer 125A can be distributed into the second layer load balancers 125B and 125C. Then each network traffic of the second layer load balancers 125B and 125C can be distributed to the third layer of the load balancers. In this example, the network traffic generated from the load balancer 125B can be distributed to the load balancers 125D, 125E, and 125F. The network traffic generated from the load balancer 125C can be distributed to the load balancers 125G, 125H, and 125I. Each of the load balancers in the lowest layer can distribute its network traffic into the target IP address/port 152A, 152B, and 152C implemented in the network layer 150 and can further be distributed by utilizing sockets 162A, 162B, and 162C implemented in the physical layer 160 of the network instance 130, such as TCP sockets. The network traffic can be uniformly or ununiformly distributed from the higher layer to the lower layer. For example, the load balancer 125 may uniformly or ununiformly distribute the network traffic to the lower level load balancers 125B and 125C. The number of layers and number of load balancers in each layer as depicted in FIG. 1C is illustrative, and the present disclosure does not limit the number of layers and load balancers in each layers. These number can be determined based on the specific application.

Figure 2A:
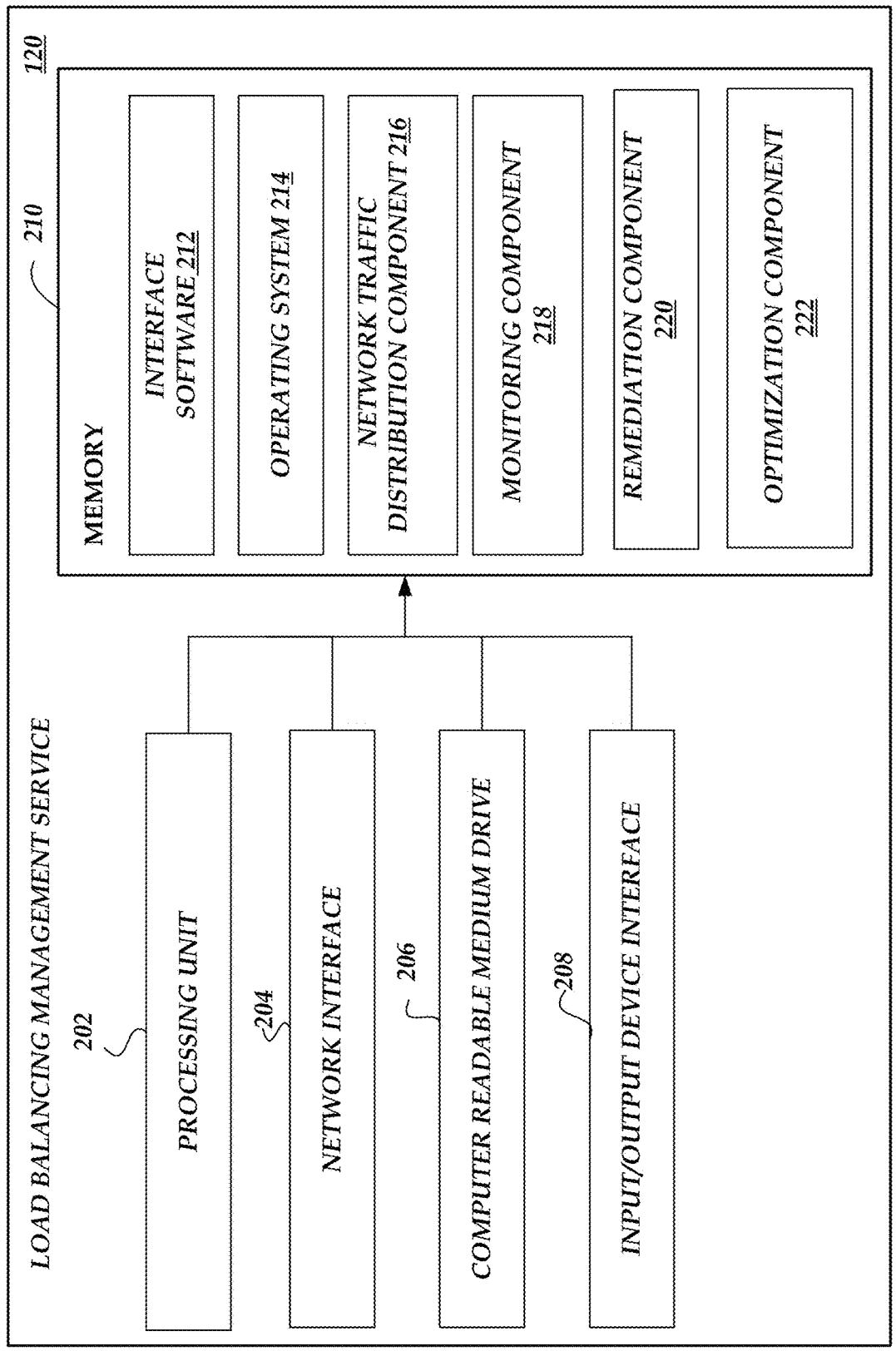
FIG. 2A is an illustrative architecture of components associated with a network load balancing management service.

FIG. 2A depicts one embodiment of an architecture of a network load balancing management service 120. The network load balancing management service 120 can be configured to manage the network load balancers' operation in distributing the network traffic. In some embodiments, the network load balancing management service 120 can be configured to monitor the network load balancers, identify network load balancers with highly utilized capacity and/or limited functionality, perform one or more remedial actions corresponding to the identified network load balancers, update the network traffic distribution, etc.

The general architecture of the network load balancing management service 120 depicted in FIG. 2 includes an arrangement of computer hardware and software components that may be used to implement aspects of the present disclosure. As illustrated, the network load balancing management service 120 includes a processing unit 202, a network interface 204, a computer-readable medium drive 206, and an input/output device interface 208, all of which may communicate with one another by way of a communication bus. The network load balancing management service 120 may be physical hardware components or implemented in a virtualized environment.

The network interface 204 may provide connectivity to one or more networks or computing systems, such as the network 104 of FIG. 1A. The processing unit 202 may thus receive information and instructions from other computing systems or services via a network. The processing unit 202 may also communicate to and from memory 210 and further provide output information via the input/output device interface 208. In some embodiments, the network load balancing management service 120 may include more (or fewer) components than those shown in FIG. 2.

The memory 210 may include computer program instructions that the processing unit 202 executes in order to implement one or more embodiments. The memory 210 generally includes RAM, ROM, or other persistent or non-transitory memory. The memory 210 may store an operating system 214 that provides computer program instructions for use by the processing unit 202 in the general administration and operation of the network load balancing management service 120. The memory 210 may further include computer program instructions and other information for implementing aspects of the present disclosure. For example, in one embodiment, the memory 210 includes interface software 212 for communicating with other components or services and performing service identification and infrastructure configuration associated with the identified services.

The memory may include a network traffic distribution component 216 for distributing network traffic with a seamless network connection and efficient network traffic distribution. In some embodiments, the network traffic distribution component 216 distributes the network traffic based on a domain name system (DNS). In these embodiments, the network traffic distribution component 216 can distribute the data generated from the client devices 102 by configuring IP addresses associated with a specific domain. For example, if the client devices 102 request DNS query to a specific domain, such as aaa.com, a list of IP addresses corresponding to the "aaa.com" domain can be identified. In some embodiments, the network service provider 110 can provide a list of target IP addresses/ports associated with the identified IP addresses. In some embodiments, the target IP addresses/ports can corresponding to virtual machine instances. Thus, in these embodiments, the network traffic distribution component 216 can distribute the network traffic generated from the client devices across the virtual instances. In some embodiments, the network traffic distribution component 216 may scale up or down the number of virtual instances based on the anticipated traffic generated from the client devices. In some embodiments, the network traffic distribution component 216 can direct the network traffic based on a specific network protocol. For example, the network traffic distribution component 216 can direct the network traffic by utilizing transport layer protocol (TCP) sockets. For example, the network traffic distribution component 216 instances direct the network traffic to the transport layer sockets 162A, 162B, and 162C of the network instance 130. The maximum number of the socket with 16 bits utilization can be 65,535. Thus, the network traffic directed to the virtual instances can be distributed to these sockets 162A, 162B, and 162C and transmitted to end points. The network traffic distribution component 216 after configuring the network distribution, can implement various distribution techniques, such as round robin load balancing, weighted round robin load balancing, least connection load balancing, weighted least connection load balancing, resource based load balancing, adaptive load balancing, fixed weighting load balancing, weighted response time load balancing, source IP hash load balancing, URL hash load balancing, etc.

In some embodiments, the network traffic distribution component 216 can direct the network traffic to a specific network level, such as a network level 4, of the network load balancer. In these embodiments, the network load balancer 125 can include multi layers to distribute the network traffic. For example, a first layer of the network load balancer 125 can be configured to distribute the data generated from the client devices into the target IP address/port, such as the virtual instances represented as network instances 130A in FIG. 1B. This first layer can also be configured to convert the public IP addresses into the target IP address/port. For example, if the client device 102 requests a DNS query, the IP addresses (e.g., public IP addresses) can be converted into the target IP address/port, thus, the network traffic distribution component 216 can distribute the network traffic into the network instances 130A, 130B, and 130C (or virtual instances). The network load balancer 125 can also include a second layer. This second layer can be utilized to direct the network traffic generated from the network instance 130A, 130B, and 130C into the TCP sockets 162A, 162B, and 162C. In some embodiments, the network load balancer 125 can be configured to include the TCP sockets 162A, 162B, and 162C in its network level 4.

The memory may include a monitoring component 218 configured to monitor the network load balancers 125. In some embodiments, the monitoring component 218 monitors the network load balancers 125A, 125B, and 125C and/or network instances 130 to determine the current utilization state of the network load balancers. For example, if one of the network instances 130 has a socket utilization reached its threshold values, the monitoring component 218 may identify the network load balancer associated with the network instance as a highly utilized network load balancer. For example, if the sockets 162A, 162B, and 162C associated with the network load balancer 125A reaches its utilization above a threshold, the monitoring component 218 may identify the network load balancer 125A as a highly utilized network load balancer. In some embodiments, the second layer of the network load balancer 125 can perform the functionality of the network instance 130. In these embodiments, the monitoring component 218 may monitor the socket utilization of the network load balancer. In some embodiments, the network load balancing management service can perform the monitoring of the current state of the network instances by monitoring the network resource's performance metrics, such as the network bandwidth, computational performance, cache, latency, network service capacity, reliability, security, quality of network service, packet-per-second (PPS) performance, etc.

The memory may include a remediation component 220 configured to provide one or more remedial actions based on the monitoring results as performed by the monitoring component 218. In some embodiments, the remediation component 220 can provide remedial actions based on the monitoring results of the network load balancers 125A, 125B, and 125C. In these embodiments, in determining that one or more network load balancers have a remaining capacity less than threshold values, the remediation component 220 may perform one or more remedial actions. For example, if the remediation component 220 identifies the network load balancer 125A has a highly utilized capacity ratio, the network load balancing management service 120 may perform remedial actions, such as redistributing the incoming network traffic to other network load balancers 125B and 125C. The remedial actions, as disclosed herein, generally referred to updating network traffic distribution (or configuration for distributing network traffic) based on the monitoring results of the socket utilizations. The present disclosure does not limit the remedial actions to any specific action.

The remedial actions, for example, can include redistributing the network traffic to other network load balancers, having a lower utilization of its capacity. The remedial actions can also include performing a health check for the network load balancer. For example, the health check may include a connectivity check to the network instances associated with the IP addresses corresponding to the network load balancer, a local processing check, such as processing crash and/or ability to write or read, a configuration check, abnormality detection, such as a clock skew or failure mode, etc. The remedial action can also include not advertising the IP addresses included in the network load balancer, having the lower available capacity and/or unhealth state. For example, in response to receiving a request related to a specific domain name, the certain IP addresses associated with the network load balancer, having the lower available capacity and/or unhealth state may not advertise its availability, thus, these IP addresses do not receive data related to the specific domain name.

The memory may include an optimization component 222 configured to optimize the network traffic distribution. In some embodiments, the optimization component 222 can optimize the network traffic distribution based on the size of data transmitted from client devices (e.g., IoT devices) and the current state of the network load balancers 125A, 125B, and 125C. For example, the optimization component 222 may anticipate the size of the incoming data transmitted from client devices 102. The optimization component 222 may further determine the current state of the network load balancers 125A, 125B, and 125C. Based on analysis of the anticipated size of the data generated from the client devices and the current state of each network load balancer, the optimization component 222 may distribute the data to the network load balancers. For example, if the anticipated incoming data to the network load balancer 125A is 500 MB and that the remaining capacity of the network instance 130 associated with the network load balancer 125A is about 500 MB, the optimization component 222 may reroute the data into other network load balancers 125B and 125C.

In some embodiments, the optimization component 222 may prioritize the data transmitted from the client devices 102 and distribute the data based on the prioritization and the current state of network load balancers 125A, 125B, and 125C. In these embodiments, the optimization component 222 may determine the weight of each data generated from the plurality of client devices 102. The weight can be determined based on the prioritization of the data and/or the size of the data. Thus, optimization component 222 may distribute the data based on the weight of each data. For example, if the current state of each network load balancer 125A, 125B, and 125C is 60%, 75%, and 80%, respectively, the data with higher weight can be distributed to the network load balancer 125A.

Figure 2B:
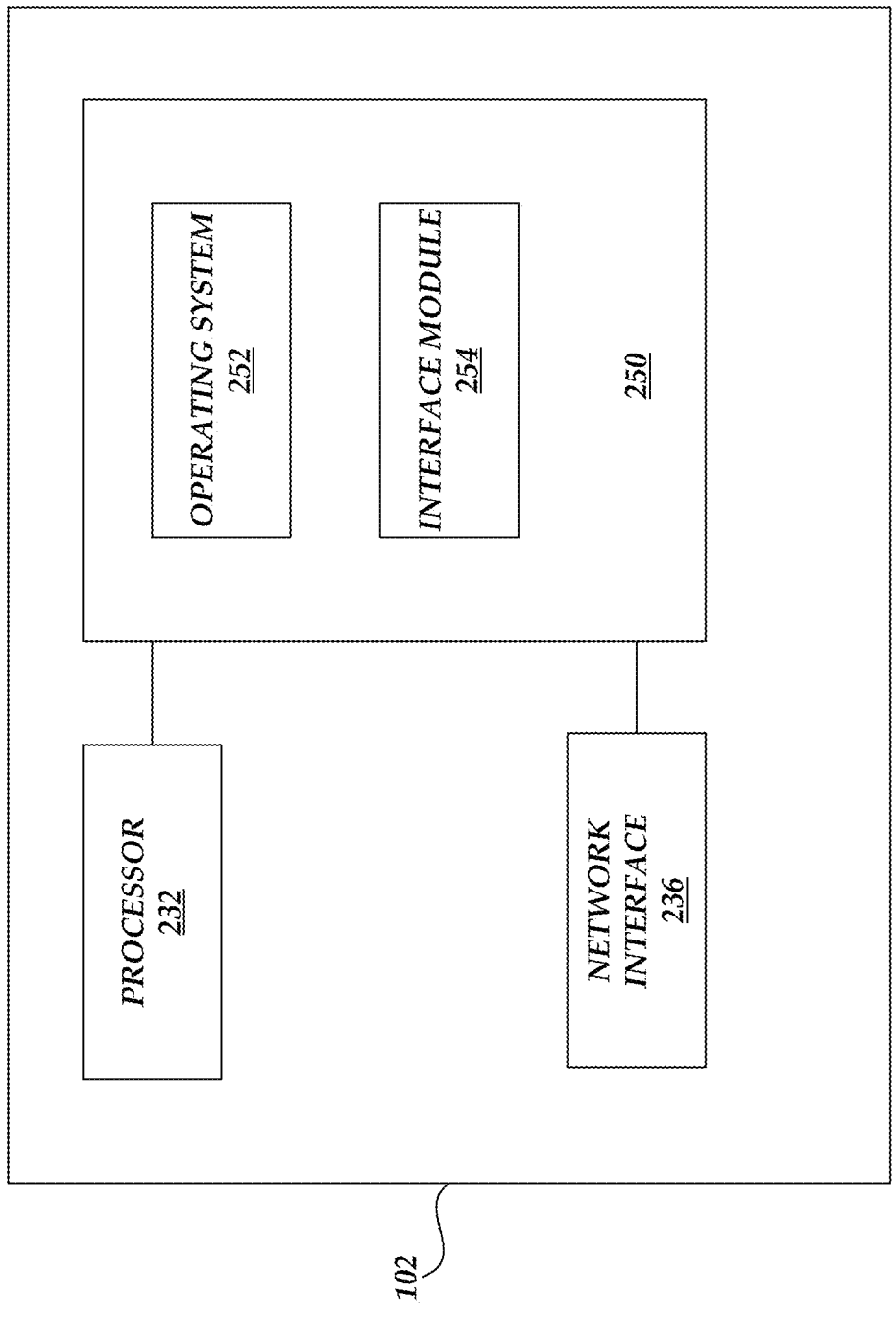
FIG. 2B is an illustrative architecture of a client device corresponding to an IoT device.

In some embodiments, the client device 102 can be an IoT device. FIG. 2B depicts a general architecture of client device 102 (e.g., IoT device) with limited functionality, which includes an arrangement of computer hardware and software configured to implement aspects of the present disclosure. The client device 102 (e.g., IoT device) may include many more (or fewer) elements than those shown in FIG. 2B. It is not necessary, however, that all of these elements be shown in order to provide an enabling disclosure.

As illustrated, the client device 102 (e.g., IoT device) includes a processor 232 and a network interface 236, which may communicate with one another by way of a communication bus 240. The network interface 236 may provide connectivity to one or more networks (such as the network 104 depicted in FIG. 1A) or computing systems and, as a result, may enable the client device 102 (e.g., IoT device) to receive and send information and instructions from and to other computing systems or services, such as the device isolation service. In some embodiments, the client device 102 (e.g., IoT device) may be configured to process instructions from the device isolation service, such as instructions to join a particular virtual network.

The processor 232 may also communicate to and from a memory 250. The memory 250 may contain computer program instructions (grouped as modules or components in some embodiments) that the processor 232 may execute in order to implement one or more embodiments. The memory 250 generally includes RAM, ROM, and/or other persistent, auxiliary, or non-transitory computer-readable media. The memory 250 may store an operating system 252 that provides computer program instructions for use by the processor 232 in the general administration and operation of the IoT device 102A. The memory 250 may further store specific computer-executable instructions and other information (which may be referred to herein as "modules" or "engines") for implementing aspects of the present disclosure. For example, the memory 250 may include an interface module 254, which in some embodiments may implement, e.g., network communications via the network interface 236. In some embodiments, the interface module 254 may be incorporated as a module in the operating system 252 or another application or module, and as such, a separate module may not be required to implement some embodiments.

Figure 2C:
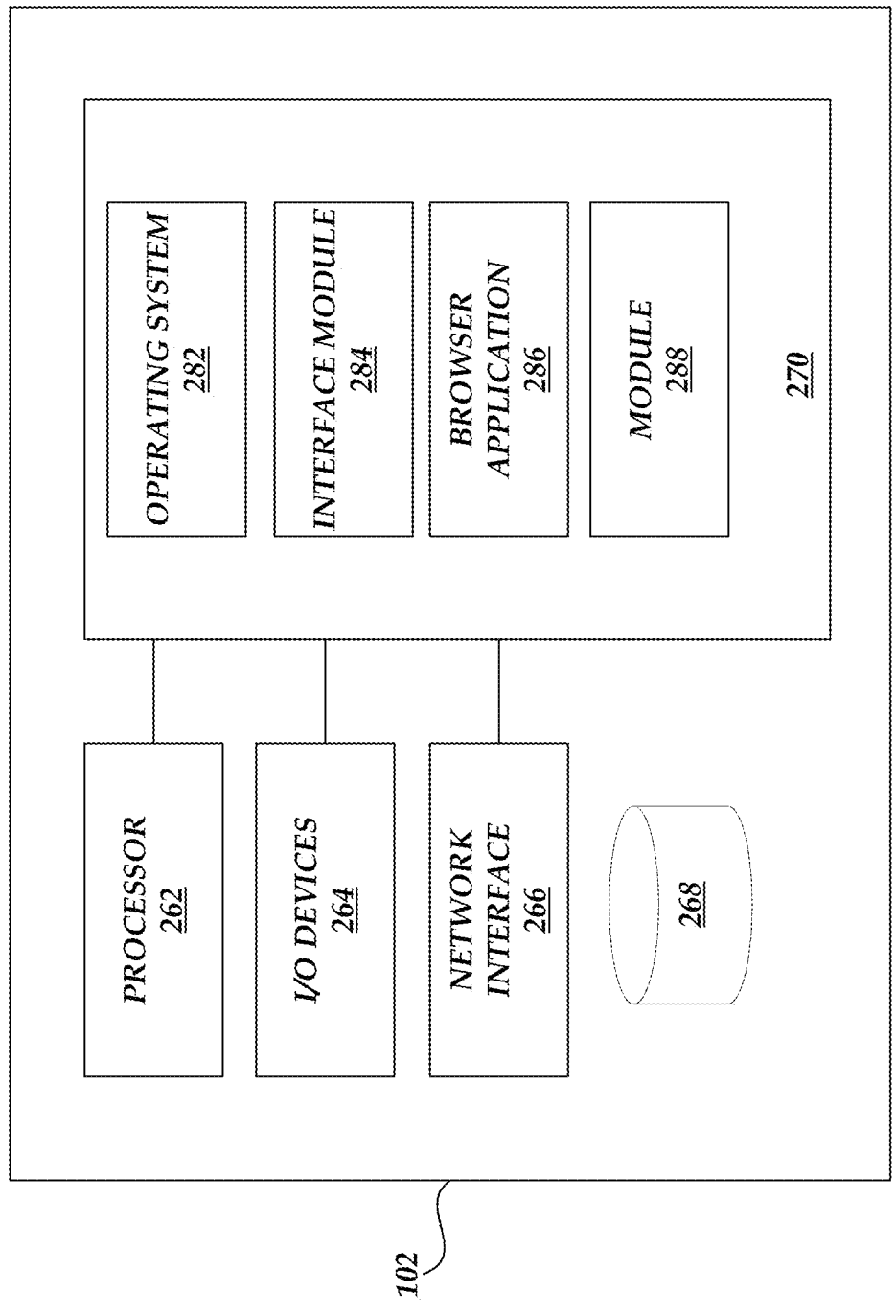
FIG. 2C is an illustrative architecture of a client device corresponding to an IoT device.

FIG. 2C depicts a general architecture of a more complex computing device (e.g., client device 102 (e.g., IoT device)), which includes an arrangement of computer hardware and software configured to implement aspects of the present disclosure. The client device 102 (e.g., IoT device) may include many more (or fewer) elements than those shown in FIG. 2C, including elements that are not included in IoT devices having more limited functionality (e.g., the client device 102 (e.g., IoT device) depicted in FIG. 2B). It is not necessary, however, that all of these elements be shown in order to provide an enabling disclosure.

As illustrated, the client device 102 (e.g., IoT device) includes a processor 262, input/output devices 264, a network interface 266, and a data store 268, all of which may communicate with one another by way of a communication bus 270. The network interface 266 may provide connectivity to one or more networks (such as the network 104 depicted in FIG. 1A) or computing systems and, as a result, may enable the IoT device, such as client device 102 depicted in FIG. 1A, to receive and send information and instructions from and to other computing systems or services, such as other IoT devices, as depicted in FIG. 1A. In some embodiments, the client device (e.g., client device 102 (e.g., IoT device) may be configured to process instructions from the device isolation service, such as instructions to join a particular virtual network. The data store 268 may illustratively be any non-transient computer-readable data store.

The processor 262 may also communicate to and from a memory 280. The memory 280 may contain computer program instructions (grouped as modules or components in some embodiments) that the processor 262 may execute in order to implement one or more embodiments. The memory 280 generally includes RAM, ROM, and/or other persistent, auxiliary, or non-transitory computer-readable media. The memory 280 may store an operating system 282 that provides computer program instructions for use by the processor 262 in the general administration and operation of the client device 102 (e.g., IoT device). The memory 280 may further store specific computer-executable instructions and other information (which may be referred to herein as "modules" or "engines") for implementing aspects of the present disclosure. For example, the memory 280 may include a user interface module 284, which in some embodiments may implement, e.g., interfaces with other IoT devices (e.g., interface between client devices 102). In some embodiments, the memory 280 may include other modules such as, e.g., a browser application 286 for accessing content on other devices. Illustratively, the browser application 286 may encompass a full software browser application, portions of a browser application, or simply be an interface software application (or executable instructions) that provide for data connectivity. In some embodiments, the memory 280 may further include a speech recognition module 288 or other modules that implement the functionality provided by the client device 102 (e.g., IoT device).

While the operating system 282, interface module 284, browser application 286, and speech recognition module 288 are illustrated as distinct modules in the memory 280, in some embodiments, one or more of the interface module 284, browser application 286, and application module(s) 288 may be incorporated as a module in the operating system 228 or another application or module, and as such, separate modules may not be required to implement some embodiments.

It will be recognized that many of the components described in FIGS. 2B and 2C are optional and that embodiments of the client device 102 (e.g., IoT devices) may or may not combine components. Furthermore, components need not be distinct or discrete. Components may also be reorganized. For example, the client device 102 (e.g., IoT devices) may be represented in a single physical device or, alternatively, may be split into multiple physical devices. In some embodiments, components illustrated as part of the client device 102 (e.g., IoT devices) may additionally or alternatively be included in other computing devices, such that some aspects of the present disclosure may be performed by the client device 102 (e.g., IoT device) while other aspects are performed by another computing device.

Figure 3:
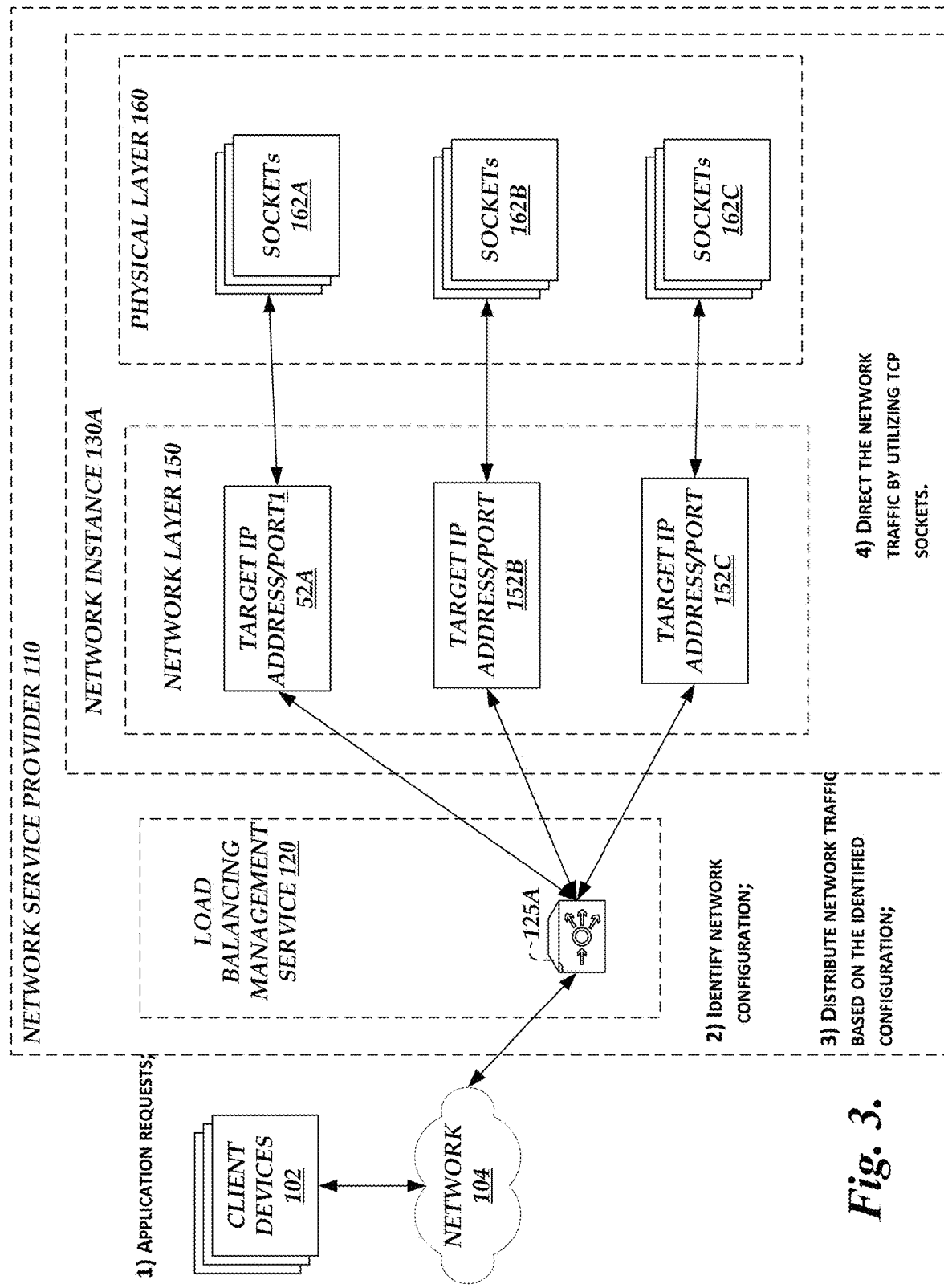
FIG. 3 is an illustrative interaction of performing network traffic distribution for distributing network traffic with a seamless network connection and efficient network traffic distribution by utilizing network load balancers.

Turning now to FIG. 3, illustrative interactions of the components of the system 100, as shown in FIG. 1A, will be described. For purposes of the illustration, it can be assumed that a network service provider 110 has been configured in a manner to implement a network load balancing management service 120 that includes one or more network load balancers 125 and network instances 130. The present application is not intended to be limited to any particular type of service or the number of individual services that may be accessed or generate processing results as part of an execution of an application on behalf of customers. Furthermore, the present application is not intended to be limited to the number of network service providers, as depicted in FIG. 1A. In addition, the present application is not intended to be limited to the number of network load balancers and network instances.

With reference to FIG. 3, an illustrative interaction of performing network traffic distribution for distributing network traffic with a seamless network connection and efficient network traffic distribution by utilizing network load balancers will be described. The interaction is illustrative. At (1), clients may request an application via the client device 102. In some embodiments, the request can be made based on a domain name system (DNS). In these embodiments, the request can be accessed to a particular internet domain by accessing the network service provider. In some embodiments, the client devices are internet on things (IOT) devices. Generally described, IoT devices are network-connected devices with a primary function other than general purpose computation. The IoT devices can be configured to generate data, such as messages, for transmission to network services with a messaging protocol, such as the MQ Telemetry Transport ("MQTT") messaging protocol. In the deployment of the IoT devices, a plurality of IoT devices can be deployed to communicate with a network service provider that each of the plurality of IoT devices are generating data and transmitting to the network service provider. For example, a voice controller in a household can be the IoT device, and if a million households use the voice controller, the voice controller data can be generated from the millions of the households and exchanged and processed within a network. The number of client devices 102, as disclosed herein, is not limited to any specific number. Thus, the IoT devices may request to send a data to a specific domain based on the MQTT protocol. For example, if a plurality of home controller devices are deployed in a plurality of households, the clients may access to a domain, such as a domain that provides access to the controlling home controller devices, to control the home controller devices. In this example, the home controller device may also transmit data related to the home controller to network instances associated with the domain name.

In some embodiments, the network load balancer, as disclosed herein, can be a domain name service (DNS) based network load balancer located in front end of the network (e.g., client side). For example, a plurality of client devices, such as a plurality of IoT devices may call domains to transmit the data. The domain name can be associated with one or more IP addresses. Once a client requests access to a specific domain, the network service provider may provide the list of IP addresses associated with the specific domain. The each of the IP addresses can be connected with servers, such as DNS servers. Thus, the network load balancer can distribute the network traffic across the DNS servers. For example, if a plurality of clients request access to an internet domain, a list of IP addresses associated with the domain's name will respond by advertising its IP addresses. Then, the network load balancer may distribute the network traffic caused by the clients to access the web domain across the DNS servers. In some embodiments, the network service provider can provide a computing cloud environment. In these embodiments, the network service provider may provide a list of network instances associated with the domain name. These network instances can be accessible by private IP addresses. In the backend of the network, these IP addresses are translated into public IP addresses and distributed to network devices, such as DNS servers. For example, once a plurality of clients request access to a specific domain, the list of IP addresses, such as public IP addresses, may respond to the clients' request. In this example, the list of IP addresses can correspond to private IP addresses associated with the IP addresses of network instances. The network load balancer in this example may distribute the network traffic to the list of network instances. Then each network instance may include multiple sockets (e.g., data socket or port), such as transmission control protocol (TCP) sockets. Thus, the clients' requests or data can be transmitted to the end points.

At (2), the network load balancer may identify network configurations that can be utilized to distribute the network traffic. In some embodiments, the network load balancing management service 120 can configure the network configuration. In these embodiments, the network load balancing management service 120 may identify IP addresses associated with a specific domain. For example, if the client devices 102 request DNS query to a specific domain, such as aaa.com, a list of IP addresses corresponding to the "aaa.com" domain can be identified. In some embodiments, the network service provider can provide a list of target IP addresses/ports associated with the identified IP addresses. In some embodiments, the target IP addresses/ports can be corresponding to virtual machine instances. Thus, in these embodiments, the network load balancing management service 120 can identify the network instance (e.g., virtual instances) as the network configuration for distributing the network traffic across the network instances. In some embodiments, the network load balancing management service 120 may scale up or down the number of virtual instances based on the anticipated traffic generated from the client devices. In some embodiments, the network load balancing management service 120 can direct the network traffic based on a specific network protocol. For example, the network load balancing management service 120 can direct the network traffic by utilizing transport layer protocol (TCP) sockets. For example, the network load balancing management service 120 directs the network traffic to the transport layer sockets 162A, 162B, and 162C of the network instance 130. The maximum number of the socket with 16 bits utilization can be 65,535. Thus, the network traffic directed to the virtual instances can be distributed to these sockets 162A, 162B, and 162C and transmitted to end points.

At (3), the network load balancing management service 120 may distribute the network traffic based on the identified network configuration. The network load balancing management service 120, after identifying the network distribution configuration, can implement various distribution techniques, such as round robin load balancing, weighted round robin load balancing, least connection load balancing, weighted least connection load balancing, resource-based load balancing, adaptive load balancing, fixed weighting load balancing, weighted response time load balancing, source IP hash load balancing, URL hash load balancing, etc.

At (4), the network load balancing management service 120 may direct the network traffic by utilizing the TCP. In some embodiments, the network load balancing management service 120 can direct the network traffic to a specific network level, such as a network level 4, of the network load balancer. In these embodiments, the network load balancer 125 can include multi layers to distribute the network traffic. For example, a first layer of the network load balancer 125 can be configured to distribute the data generated from the client devices into the target IP addresses/ports, such as the virtual instances represented as network instances 130A in FIG. 1B. This first layer can also be configured to convert the public IP addresses into the target IP addresses/ports, wherein the target IP address/port are associated with IP addresses or TCP ports, corresponding to the network instance. For example, if the client device 102 requests a DNS query, the IP addresses (e.g., public IP addresses) can be converted into the target IP addresses/ports, thus, the network load balancing management service 120 can distribute the network traffic into the network instances 130A, 130B, and 130C (shown in FIG. 1A). The network load balancer 125 can also include a second layer. This second layer can be utilized to direct the network traffic generated from the network instance into the TCP sockets 162A, 162B, and 162C. In some embodiments, the network load balancer 125 can be configured to include the TCP sockets 162A, 162B, and 162C in its network level 4.

Figure 4:
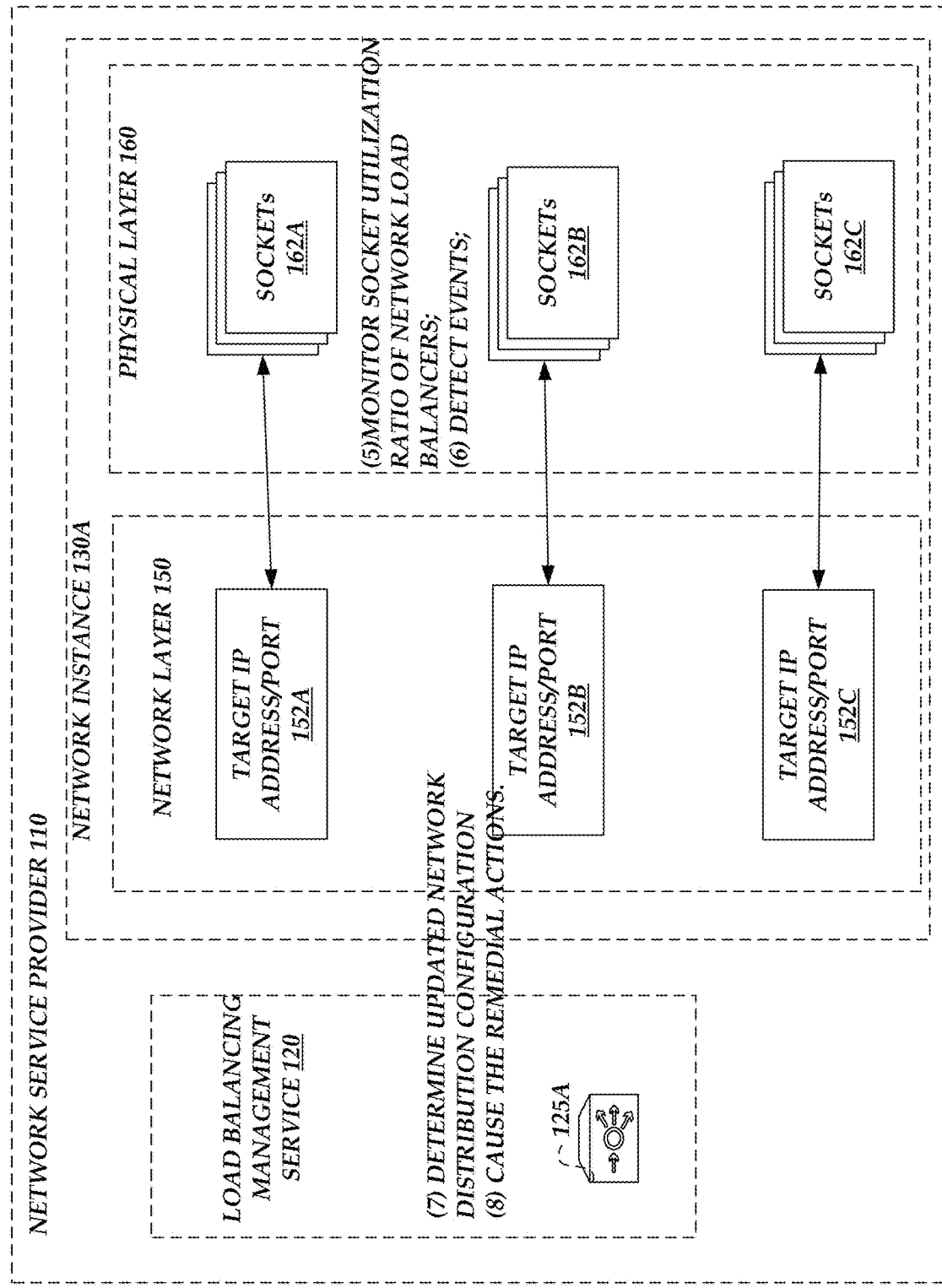
FIG. 4 is an illustrative interaction of monitoring network load balancers.

With reference to FIG. 4, an illustrative interaction of monitoring network load balancers and implementing remedial actions based on the monitoring results will be described. The interaction is illustrative. At (5), the network load balancing management service 120 can monitor the network load balancers. In some embodiments, the network load balancing management service 120 monitors the network load balancers 125A, 125B, and 125C, network instances 130A to determine the current utilization state of the network load balancers. For example, if one of the network instances 130 has a socket utilization reached its threshold values, the network load balancing management service 120 may identify the network load balancer associated with the network instance as a highly utilized network load balancer. For example, if the sockets 162A, 162B, and 162C associated with the network load balancer 125A reached its utilization above a threshold, the network load balancing management service 120 may identify the network load balancer 125A as a highly utilized network load balancer. In some embodiments, the second layer of the network load balancer 125 can perform the functionality of the network instance 130. In these embodiments, the network load balancing management service 120 may monitor the socket utilization of the network load balancer. In some embodiments, the network load balancing management service 120 can perform the monitoring of the current state of the network load balancers by monitoring the network resource's performance metrics associated with the network load balancers, such as the network bandwidth, computational performance, cache, latency, network service capacity, reliability, security, quality of network service, packet-per-second (PPS) performance, etc.

At (6), the network load balancing management service 120 can determine whether a socket utilization ratio of at least one socket associated with the load balancer is within its criteria. For example, the criteria can be a 75% socket utilization, and if at least one socket associated with the load balancer has its socket utilization at or above the 75%, the socket utilization ratio of the load balancer is not within the criteria. The criteria also can be the health of the load balancer. For example, if the at least one of the load balance is failed its health check, the load balancer's operation is not within the criteria. The utilization ratio can be automatically monitored at (5), and the network load balancing management service 120 may perform the health check operations for each network load balancer. For example, the health check may include a connectivity check to the network instances associated with the IP addresses corresponding to the network load balancer, a local processing check, such as processing crash and/or ability to write or read, a configuration check, anomaly detection, such as a clock skew or failure mode, etc. In some embodiments, the criteria can also be at least based on monitoring the network resource's performance metrics, such as the network bandwidth, computational performance, cache, latency, network service capacity, reliability, security, quality of network service, packet-per-second (PPS) performance, etc.

At (7), in response to detecting the state or operational state of the load balancer is at or above its criteria, the network load balancing management service 120 can perform provide one or more remedial actions based on the monitoring results as performed by the monitoring component 218. In some embodiments, the network load balancing management service 120 can provide remedial actions based on the monitoring results of the network load balancers. In these embodiments, in determining that one or more network load balancers have a remaining capacity of less than threshold values, the network load balancing management service 120 may perform one or more remedial actions. For example, if the network load balancing management service 120 identifies the network load balancer 125A has a highly utilized capacity ratio, the network load balancing management service 120 may perform remedial actions, such as redistributing the incoming network traffic to other network load balancers 125B and 125C.

The remedial actions, for example, can include redistributing the network traffic to other network load balancers, having a lower utilization of its capacity. The remedial actions can also include performing health check for the network load balancer. For example, the health check may include a connectivity check to the network instances associated with the IP addresses corresponding to the network load balancer, a local processing check, such as processing crash and/or ability to write or read, a configuration check, abnormality detection, such as a clock skew or failure mode, etc. The remedial action can also include not advertising the IP addresses included in the network load balancer, having the lower available capacity and/or unhealth state. For example, in response to receiving a request related to a specific domain name, the certain IP addresses associated with the network load balancer, having the lower available capacity and/or unhealth state may not advertise its availability, thus, these IP addresses do not receive data related to the specific domain name.

The network load balancing management service 120 can be configured to optimize the network traffic distribution. In some embodiments, the network load balancing management service 120 can optimize the network traffic distribution based on size of data transmitted from client devices (e.g., IoT devices) and the current state of the network load balancers 125A, 125B, and 125C. For example, the network load balancing management service 120 may anticipate the size of the incoming data transmitted from client devices 102. The optimization component 222 may further determine the current state of the network load balancers 125A, 125B, and 125C. Based on analysis of the anticipated size of the data generated from the client devices and the current state of each network load balancer, the network load balancing management service 120 may distribute the data to the network load balancers. For example, if the anticipated incoming data to the network load balancer 125A is 500 MB and the remaining capacity of the network instance 130 associated with the network load balancer 125A is about 500 MB, the optimization component 222 may reroute the data into other network load balancers 125B and 125C.

In some embodiments, the network load balancing management service 120 may prioritize the data transmitted from the client devices 102 and distribute the data based on the prioritization and the current state of network load balancers 125A, 125B, and 125C. In these embodiments, the network load balancing management service 120 may determine weight of each data generated from the plurality of client devices 102. The weight can be determined based on the prioritization of the data and/or size of the data. Thus, the network load balancing management service 120 may distribute the data based on the weight of each data. For example, if the current state of each network load balancer 125A, 125B, and 125C is 60%, 75%, and 80%, respectively, the data with higher weight can be distributed to the network load balancer 125A.

Figure 5:
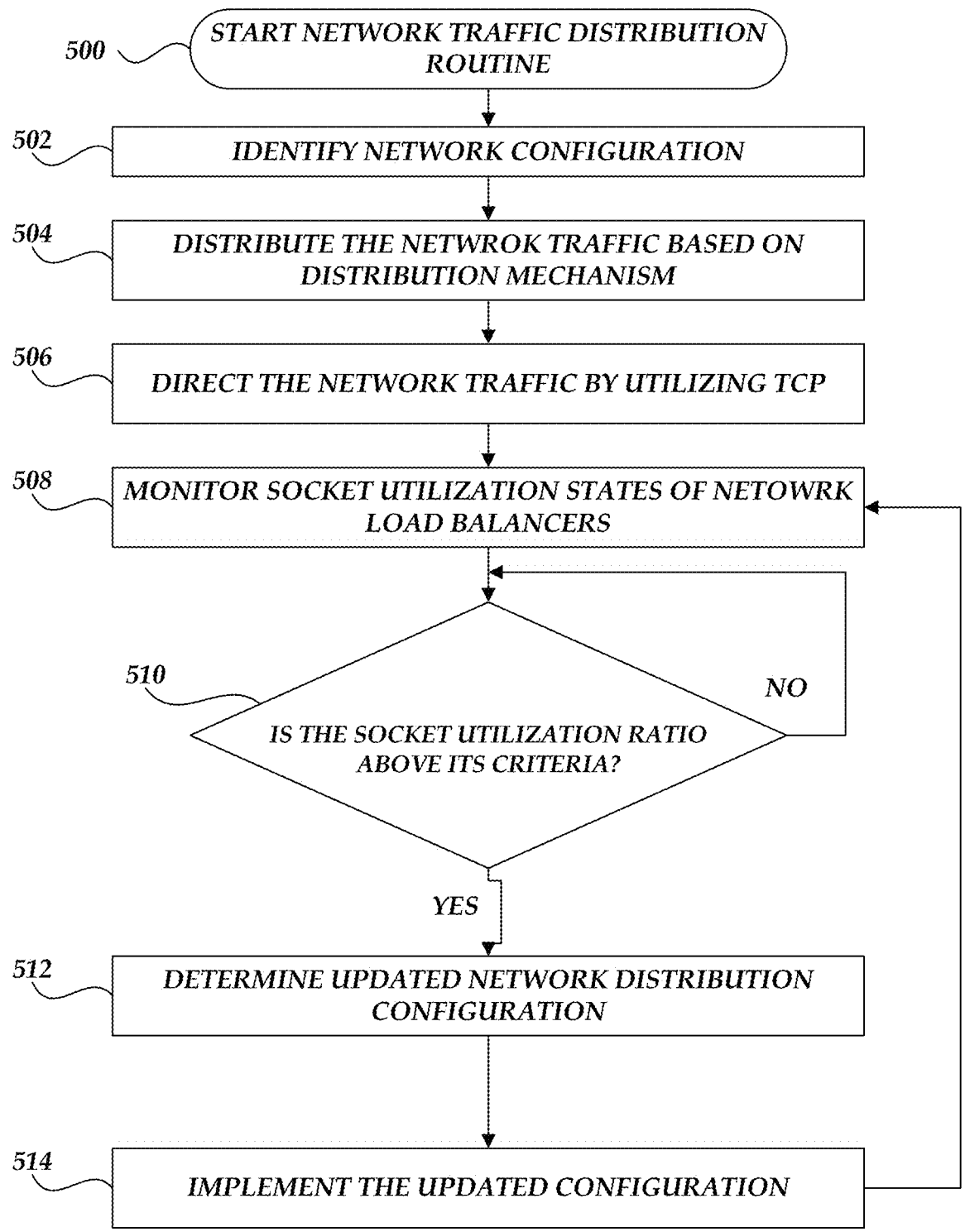
FIG. 5 is a flow diagram illustrative of a network traffic distribution routine implemented by a network load balancing management service in accordance with illustrative aspects of the present disclosure.

Turning now to FIG. 5, a routine 500 for network traffic distribution routine utilizing the network load balancing management service 120 will be described.

At block 502, the network load balancer may identify a network configuration that can be utilized to distribute the network traffic. In some embodiments, the network traffic can be generated by client devices, such that clients may request an application via the client device 102. In some embodiments, the request can be made based on a domain name system (DNS). In these embodiments, the request can be accessing to a particular internet domain by accessing to the network service provider. In some embodiments, the client devices are internet on things (IOT) devices. Generally described, IoT devices are network-connected devices with a primary function other than general purpose computation. The IoT devices can be configured to generate data, such as messages, for transmission to network services with a messaging protocol, such as the MQ Telemetry Transport ("MQTT") messaging protocol. In the deployment of the IoT devices, a plurality of IoT devices can be deployed to communicate with a network service provider that each of the plurality of IoT devices is generating data and transmitting to the network service provider. For example, a voice controller in a household can be the IoT device, and if a million households use the voice controller, the voice controller data can be generated from the millions of the households and exchanged and processed within a network. The number of client devices 102, as disclosed herein, is not limited to any specific number. Thus, the IoT devices may request to send a data to a specific domain based on the MQTT protocol. For example, if a plurality of home controller devices are deployed in a plurality of households, the clients may access to a domain, such as a domain that provides access to the controlling the home controller devices, to control the home controller devices. In this example, the home controller device may also transmit data related to the home controller to network instances associated with the domain name.

In some embodiments, the network load balancing management service 120 can configure the network configuration. In these embodiments, the network load balancing management service 120 may identify IP addresses associated with a specific domain. For example, if the client devices 102 request DNS query to a specific domain, such as aaa.com, a list of IP addresses corresponding to the "aaa.com" domain can be identified. In some embodiments, the network service provider can provide a list of target IP address/port associated with the identified IP addresses. In some embodiments, the target IP addresses/ports can be corresponding to virtual machine instances. Thus, in these embodiments, the network load balancing management service 120 can identify the virtual instances as the network configuration for distributing the network traffic across the virtual instances. In some embodiments, the network load balancing management service 120 may scale up or down the number of virtual instances based on the anticipated traffic generated from the client devices. In some embodiments, the network load balancing management service 120 can direct the network traffic based on a specific network protocol. For example, the network load balancing management service 120 can direct the network traffic by utilizing transport layer protocol (TCP) sockets. For example, the network load balancing management service 120 direct the network traffic to the transport layer sockets 162A, 162B, and 162C of the network instance 130. The maximum number of the socket with 16 bits utilization can be 65,535. Thus, the network traffic directed to the virtual instances can be distributed to these sockets 162A, 162B, and 162C and transmitted to end points.

At block 504, the network load balancing management service 120 may distribute the network traffic based on a network traffic distribution mechanism. For example, the distribution mechanism can include distributing the network traffic based on the identified network configuration. The network load balancing management service 120, after identifying the network distribution configuration can implement various distribution techniques, such as round robin load balancing, weighted round robin load balancing, least connection load balancing, weighted least connection load balancing, resource-based load balancing, adaptive load balancing, fixed weighting load balancing, weighted response time load balancing, source IP hash load balancing, URL hash load balancing, etc.

At block 506, the network load balancing management service 120 may direct the network traffic by utilizing the TCP. In some embodiments, the network load balancing management service 120 can direct the network traffic to a specific network level, such as a network level 4, of the network load balancer. In these embodiments, the network load balancer 125 can include multi layers to distribute the network traffic. For example, a first layer of the network load balancer 125 can be configured to distribute the data generated from the client devices into the target IP addresses/ports, such as the virtual instances represented as network instances 130A in FIG. 1B. This first layer can also be configured to convert the public IP addresses into the target IP addresses/ports. For example, if the client device 102 requests a DNS query, the IP addresses (e.g., public IP addresses) can be converted into the target IP addresses/ports, thus, the network load balancing management service 120 can distribute the network traffic into the network instances 130A, 130B, and 130C (shown in FIG. 1A). The network load balancer 125 can also include a second layer. This second layer can be utilized to direct the network traffic generated from the network instance into the TCP sockets 162A, 162B, and 162C. In some embodiments, the network load balancer 125 can be configured to include the TCP sockets 162A, 162B, and 162C in its network level 4.

At block 508, the network load balancing management service 120 can monitor the socket utilization states of the network load balancers. The socket utilization states can be the utilization ratio of the socket. In some embodiments, the network load balancing management service 120 monitors the network load balancers 125A, 125B, and 125C, and network instances to determine the current utilization state of the network load balancers. For example, if one of the network instances 130 has a socket utilization reached its threshold values, the network load balancing management service 120 may identify the network load balancer associated with the network instance as a highly utilized network load balancer. For example, if sockets 162A, 162B, and 162C associated with the network load balancer 125A reached its utilization above a threshold, the network load balancing management service 120 may identify the network load balancer 125A as a highly utilized network load balancer. In some embodiments, the second layer of the network load balancer 125 can perform the functionality of the network instance 130. In these embodiments, the network load balancing management service 120 may monitor the socket utilization of the network load balancer. In some embodiments, the network load balancing management service 120 can perform the monitoring of the current state of the network load balancers by monitoring the network resource's performance metrics associated with the network load balancers, such as the network bandwidth, computational performance, cache, latency, network service capacity, reliability, security, quality of network service, packet-per-second (PPS) performance, etc.

At block 510, the network load balancing management service 120 can determine whether a socket utilization ratio of at least one socket associated with the load balancer is within its criteria. For example, the criteria can be a 75% socket utilization, and if at least one socket associated with the load balancer has its socket utilization at or above the 75%, the socket utilization ratio of the load balancer is not within the criteria. The criteria also can be the health of the load balancer. For example, if the at least one of the load balance is failed its health check, the load balancer's operation is not within the criteria. In some embodiments, the utilization ratio can be automatically monitored at block 508, and the network load balancing management service 120 may perform the health check operations for each of the network load balancers. For example, the health check may include a connectivity check to the network instances associated with the IP addresses corresponding to the network load balancer, a local processing check, such as processing crash and/or ability to write or read, a configuration check, abnormality detection, such as a clock skew or failure mode, etc. In some embodiments, the criteria can also be at least based on monitoring the network resource's performance metrics, such as the network bandwidth, computational performance, cache, latency, network service capacity, reliability, security, quality of network service, packet-per-second (PPS) performance, etc. If the network load balancing management service 120 detected that the load balancer's operation or state is at or above its criteria, the routine proceeded to the block 512.

At block 512, the network load balancing management service 120 can determine an updated network distribution configuration that can redistribute the network traffic. In some embodiments, the network load balancing management service 120 can provide remedial actions based on the monitoring results of the network load balancers. In these embodiments, in determining that one or more network load balancers have a remaining capacity of less than threshold values, the network load balancing management service 120 may perform one or more remedial actions. For example, if the network load balancing management service 120 identifies the network load balancer 125A has a highly utilized capacity ratio, the network load balancing management service 120 may perform remedial actions, such as redistributing the incoming network traffic to other network load balancers 125B and 125C.

The remedial actions, for example, can include redistributing the network traffic to other network load balancers, having a lower utilization of its capacity. The remedial actions can also include performing a health check for the network load balancer. For example, the health check may include a connectivity check to the network instances associated with the IP addresses corresponding to the network load balancer, a local processing check, such as processing crash and/or ability to write or read, a configuration check, abnormality detection, such as a clock skew or failure mode, etc. The remedial action can also include not advertising the IP addresses included in the network load balancer, having the lower available capacity and/or unhealth state. For example, in response to receiving a request related to a specific domain name, the certain IP addresses associated with the network load balancer, having the lower available capacity and/or unhealth state, may not advertise their availability, thus, these IP addresses do not receive data related to the specific domain name.

The network load balancing management service 120 can be configured to optimize the network traffic distribution. In some embodiments, the network load balancing management service 120 can optimize the network traffic distribution based on size of data transmitted from client devices (e.g., IoT devices) and the current state of the network load balancers 125A, 125B, and 125C. For example, the network load balancing management service 120 may anticipate the size of the incoming data transmitted from client devices 102. The optimization component 222 may further determine the current state of the network load balancers 125A, 125B, and 125C. Based on analysis of the anticipated size of the data generated from the client devices and the current state of each network load balancer, the network load balancing management service 120 may distribute the data to the network load balancers. For example, if the anticipated incoming data to the network load balancer 125A is 500 MB and the remaining capacity of the network instance 130 associated with the network load balancer 125A is about 500 MB, the optimization component 222 may reroute the data into other network load balancers 125B and 125C.

In some embodiments, the network load balancing management service 120 may prioritize the data transmitted from the client devices 102 and distribute the data based on the prioritization and the current state of network load balancers 125A, 125B, and 125C. In these embodiments, the network load balancing management service 120 may determine weight of each data generated from the plurality of client devices 102. The weight can be determined based on the prioritization of the data and/or size of the data. Thus, the network load balancing management service 120 may distribute the data based on the weight of each data. For example, if the current state of each network load balancer 125A, 125B, and 125C is 60%, 75%, and 80%, respectively, the data with higher weight can be distributed to the network load balancer 125A.

At block 514, the network load balancing management service 120 may implement the remedial actions. After implementing the remedial actions, the routine can be continuously performed by monitoring the network load balancers at block 508.

Depending on the embodiment, certain acts, events, criteria, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a similarity detection system, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A similarity detection system can be or include a microprocessor, but in the alternative, the similarity detection system can be or include a controller, microcontroller, or state machine, combinations of the same, or the like configured to estimate and communicate prediction information. A similarity detection system can include electrical circuitry configured to process computer-executable instructions. Although described herein primarily with respect to digital technology, a similarity detection system may also include primarily analog components. For example, some or all of the prediction algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a similarity detection system, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the similarity detection system such that the similarity detection system can read information from, and write information to, the storage medium. In the alternative, the storage medium can be integral to the similarity detection system. The similarity detection system and the storage medium can reside in an ASIC. The ASIC can reside in a user terminal. In the alternative, the similarity detection system and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for providing network traffic distribution for network-based services, the system comprising:
  a plurality of network load balancers, wherein individual load balancers include one or more computing processors and memories for executing computer-executable instructions that cause individual network load balancers of the plurality of network load balancers to:
    obtain, from a plurality of client devices, requests to access to a domain;
    identify network configurations by:
      identifying a set of IP addresses associated with the domain; and
      in response to identifying the set of IP addresses, identify a combination of target IP addresses and target ports associated with the IP addresses, wherein each target IP address and target port of the combination of target IP addresses and target ports correspond to IP addresses of virtual machine instances; and
    distribute network traffic generated from the plurality of client devices based on a network traffic distribution mechanism;
  one or more computing processors and memories for executing computer-executable instructions to implement a network load balancing management service, wherein the network load balancing management service is configured to:
    monitor the plurality of network load balancers, wherein the monitoring of the network load balancers includes monitoring socket utilization states of the network load balancers;

detect at least one of the network load balancers' socket utilization state is above a threshold utilization ratio;

in response to detecting the at least one network load balancers' socket utilization state is above the threshold utilization ratio, determine remedial actions based at least on monitoring results of the network load balancers; and cause implementation of the determined remedial actions in the set of network load balancers.

2. The system of claim 1, wherein the plurality of client devices corresponds to internet on things (IoTs) devices.

3. The system of claim 1, wherein the network load balancer includes a first and second layers.

4. The system of claim 3, wherein the first layer is configured to convert the identified IP addresses into the combination of target IP addresses and target ports, and wherein the second layer is a TCP layer and configured to distribute the network traffic via sockets included in the TCP layer.

5. The system of claim 1, wherein the network load balancing management service is configured to perform the monitoring of current states of the network load balancers by monitoring network resource's performance metrics associated with the network load balancers, wherein the network resource's performance metrics include network bandwidths, computational performances, caches, a latency, a network capacity, a network reliability, a network security, a quality of network service, and a packet-per-second (PPS) performance.

6. The system of claim 1, wherein the remedial actions include a health check of the network load balancers, wherein the health check is performed periodically, and wherein the health check includes a connectivity check, a local processing check, a configuration check, and an anomality detection.

7. The system of claim 1, wherein the network load balancing management service is configured to optimize the network traffic based at least on size of data transmitted from the client devices and monitoring results of the network load balancers.

8. The system of claim 1, wherein the network load balancing management service is configured to prioritize data include in the network traffic, wherein the prioritization is weighing the data based at least on priority of the data and monitoring results of the network load balancers.

9. The system of claim 1, wherein the network load balancing management service distributes the network traffic to the combination of target IP addresses and target ports by utilizing one or more network communication protocols, wherein each target address and target port of the combination of target IP addresses and target ports uses a network communication protocol from the one or more network communication protocols.

10. The system of claim 1, wherein the plurality of network load balancers are arranged in a hierarchical configuration.

11. A system for providing network traffic distribution for network-based services, the system comprising:

one or more computing processors and memories for executing computer-executable instructions to implement a network load balancing management service, wherein the network load balancing management service is configured to:

monitor a plurality of network load balancers, wherein the monitoring of the network load balancers includes monitoring socket utilization states of the network load balancers, wherein the plurality of network load balancers is configured to distribute network traffic by identifying network configurations that identify a combination of target IP addresses and target ports, and wherein identifying the network configurations is comprising:

obtaining, from a plurality of client devices, requests to access to a domain, identifying a set of IP addresses associated with the domain, and in response to identifying the set of IP addresses, identifying the combination of target IP addresses and target ports associated with the IP addresses;

determine updated network distribution configurations based at least on a determination of the socket utilization states of network load balancers above a threshold utilization ratio; and cause implementation of an updated network configuration from the determined updated network distribution configurations.

12. The system of claim 11, wherein a plurality of internet on things (IoTs) devices transmit data to the network load balancers.

13. The system of claim 11, wherein the network load balancer includes a first and second layers.

14. The system of claim 13, wherein the first layer is configured to convert the identified IP addresses into the combination of target IP addresses and target ports, and wherein the second layer is a TCP layer and configured to distribute the network traffic via sockets included in the TCP layer.

15. The system of claim 11, wherein the network load balancing management service is configured to perform the monitoring of current states of the network load balancers by monitoring network resource's performance metrics associated with the network load balancers, wherein the network resource's performance metrics include network bandwidths, computational performances, caches, a latency, a network capacity, a network reliability, a network security, a quality of network service, and a packet-per-second (PPS) performance.

16. The system of claim 11, wherein the determination of the updated network distribution configurations include a health check of the network load balancers, wherein the health check is performed periodically, and wherein the health check includes a connectivity check, a local processing check, a configuration check, and an anomality detection.

17. The system of claim 11, wherein the network load balancing management service is configured to optimize the network traffic based at least on size of data transmitted from client devices and monitoring results of the network load balancers.

18. The system of claim 11, wherein the network load balancing management service is configured to prioritize data include in the network traffic, wherein the prioritization is weighing the data based at least on priority of the data and monitoring results of the network load balancers.

19. The system of claim 11, wherein the plurality of network load balancers are arranged in a hierarchical configuration.

20. A computer-implemented method for providing network traffic distribution by using a network load balancing management service, the method comprising:

obtaining, from a plurality of client devices, requests to access to a domain;

identifying network configurations by:
  identifying IP addresses associated with the domain; and
  in response to identifying the IP addresses, identify a combination of target IP addresses and target ports associated with the IP addresses, wherein each target IP address and target port of the combination of target IP address and target ports correspond to IP addresses of virtual machine instances;
distributing network traffic generated from the plurality of client devices;
directing the network traffic by utilizing a transmission control protocol (TCP);
monitoring network load balancers, wherein the monitoring of the network load balancers include monitoring socket utilization states of the network load balancers;
detecting at least one of the network load balancers' socket utilization state is above a threshold utilization ratio;
in response to detecting the at least one network load balancers' socket utilization state is above the threshold utilization ratio, determining remedial actions based at least on monitoring results of the network load balancers; and
implementing the determined remedial actions.

21. The system of claim 11, wherein each target IP address and target port of the combination of target IP addresses and target ports are corresponding to IP addresses of virtual machine instances, and wherein the distribution the network traffic is based on a transmission control protocol (TCP).

22. The computer-implemented method of claim 20, wherein the plurality of client devices corresponds to internet on things (IoTs) devices.

23. The computer-implemented method of claim 20, wherein the network load balancer includes a first and second layers.

24. The computer-implemented method of claim 23, wherein the first layer is configured to convert the identified IP addresses into the combination of target IP addresses and target ports, and wherein the second layer is a TCP layer and configured to distribute the network traffic via sockets included in the TCP layer.

25. The computer-implemented method of claim 20, wherein the network load balancing management service is configured to perform the monitoring of current states of the network load balancers by monitoring network resource's performance metrics associated with the network load balancers, wherein the network resource's performance metrics include network bandwidths, computational performances, caches, a latency, a network capacity, a network reliability, a network security, a quality of network service, and a packet-per-second (PPS) performance.

26. The computer-implemented method of claim 20, wherein the remedial actions include a health check of the network load balancers, wherein the health check is performed periodically, and wherein the health check includes a connectivity check, a local processing check, a configuration check, and an anomaly detection.

27. The computer-implemented method of claim 20, wherein the network load balancing management service is configured to optimize the network traffic based at least on size of data transmitted from the client devices and monitoring results of the network load balancers.

28. The computer-implemented method of claim 20, wherein the network load balancing management service is configured to prioritize data include in the network traffic, wherein the prioritization is weighing the data based at least on priority of the data and monitoring results of the network load balancers.

29. The computer-implemented method of claim 20, wherein the network load balancers are arranged in a hierarchical configuration.

* * * * *